US012677143B2

(12) United States Patent (10) Patent No.: US 12,677,143 B2
Salmela et al. (45) Date of Patent: Jul. 7, 2026

(54) SUBSCRIPTION IDENTIFIER CONCEALMENT IN A COMMUNICATION NETWORK

(71) Applicant: Telefonaktiebolaget LM Ericsson (publ), Stockholm (SE)

(72) Inventors: Patrik Salmela, Espoo (FI); Vesa Lehtovirta, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 450 days.

(21) Appl. No.: 18/256,769

(22) PCT Filed: Dec. 28, 2020

(86) PCT No.: PCT/EP2020/087914
§ 371 (c)(1),
(2) Date: Jun. 9, 2023

(87) PCT Pub. No.: WO2022/144066
PCT Pub. Date: Jul. 7, 2022

(65) Prior Publication Data
US 2024/0031799 A1      Jan. 25, 2024

(51) Int. Cl.
*H04W 12/03*      (2021.01)
*H04L 9/30*      (2006.01)
(Continued)

(52) U.S. Cl.
CPC ........... *H04W 12/03* (2021.01); *H04L 9/3073* (2013.01); *H04W 8/205* (2013.01); *H04W 12/72* (2021.01); *H04L 2209/80* (2013.01)

(58) Field of Classification Search
CPC ...... H04W 12/03; H04W 8/205; H04W 12/72
See application file for complete search history.

(56) References Cited

U.S. PATENT DOCUMENTS

2005/0209972 A1   9/2005   Bjorkengren et al.
2019/0149521 A1*  5/2019   Jerichow .............. H04L 9/3226
                                                           713/171
(Continued)

FOREIGN PATENT DOCUMENTS

WO   2020250664 A1   12/2020

OTHER PUBLICATIONS

3GPP, "3GPP TR 33.819 V2.0.0", 3rd Generation Partnership Project; Technical Specification Group Services and System Aspects; Study on security for 5GS enhanced support of Vertical and LAN Services; (Release 16), Dec. 2019, 1-46.
(Continued)

*Primary Examiner* — Barry W Taylor
(74) *Attorney, Agent, or Firm* — Weisberg I.P. Law, P.A.

(57) ABSTRACT

Communication equipment (4, 6) generates an inner subscription concealed identifier (10C). Generating the inner subscription concealed identifier (10C) includes concealing at least a part of a subscription identifier (10S) using cryptographic key material (10K) associated with a first communication network (10), e.g., a non-public network. The subscription identifier (10S) identifies a subscription to the first communication network (10). The communication equipment (4, 6) generates an outer subscription concealed identifier (20C). Generating the outer subscription concealed identifier (20C) includes concealing the inner subscription concealed identifier (10C) using cryptographic key material (20K) associated with a second communication network (20), e.g., a public network. The communication equipment (4, 6) transmits the outer subscription concealed identifier (20C).

18 Claims, 26 Drawing Sheets

(51) Int. Cl.
_H04W 8/20_ (2009.01)
_H04W 12/72_ (2021.01)

(56) References Cited

U.S. PATENT DOCUMENTS

| | | | |
|---|---|---|---|
| 2021/0306849 A1* | 9/2021 | Liu ......................... | H04W 8/02 |
| 2022/0104009 A1* | 3/2022 | Baskaran .............. | H04W 12/72 |
| 2024/0107483 A1* | 3/2024 | Voyer ................... | H04W 12/06 |
| 2025/0048113 A1* | 2/2025 | Banerjee .............. | H04W 12/72 |

OTHER PUBLICATIONS

3GPP, "3GPP TS 23.501 V16.7.0", 3rd Generation Partnership Project; Technical Specification Group Services and System Aspects; System architecture for the 5G System (5GS); Stage 2 (Release 16), Dec. 2020, 1-450.

NEC, "Solution for separation of multiple NPN credentials", 3GPP TSG SA WG3 (Security) Meeting #95bis, S3-191898, revision of S3-19xabc, Sapporo (Japan), Jun. 24-28, 2019, 1-2.

* cited by examiner

SUBSCRIPTION IDENTIFIER 10S

SECOND NETWORK IDENTIFIER 54

FIRST NETWORK IDENTIFIER 52

NETWORK-SPECIFIC SUBSCRIPTION IDENTIFIER 56

IMSI 50

54 MNC+MCC

52 FIRST NETWORK IDENTIFIER 52

56 MSIN

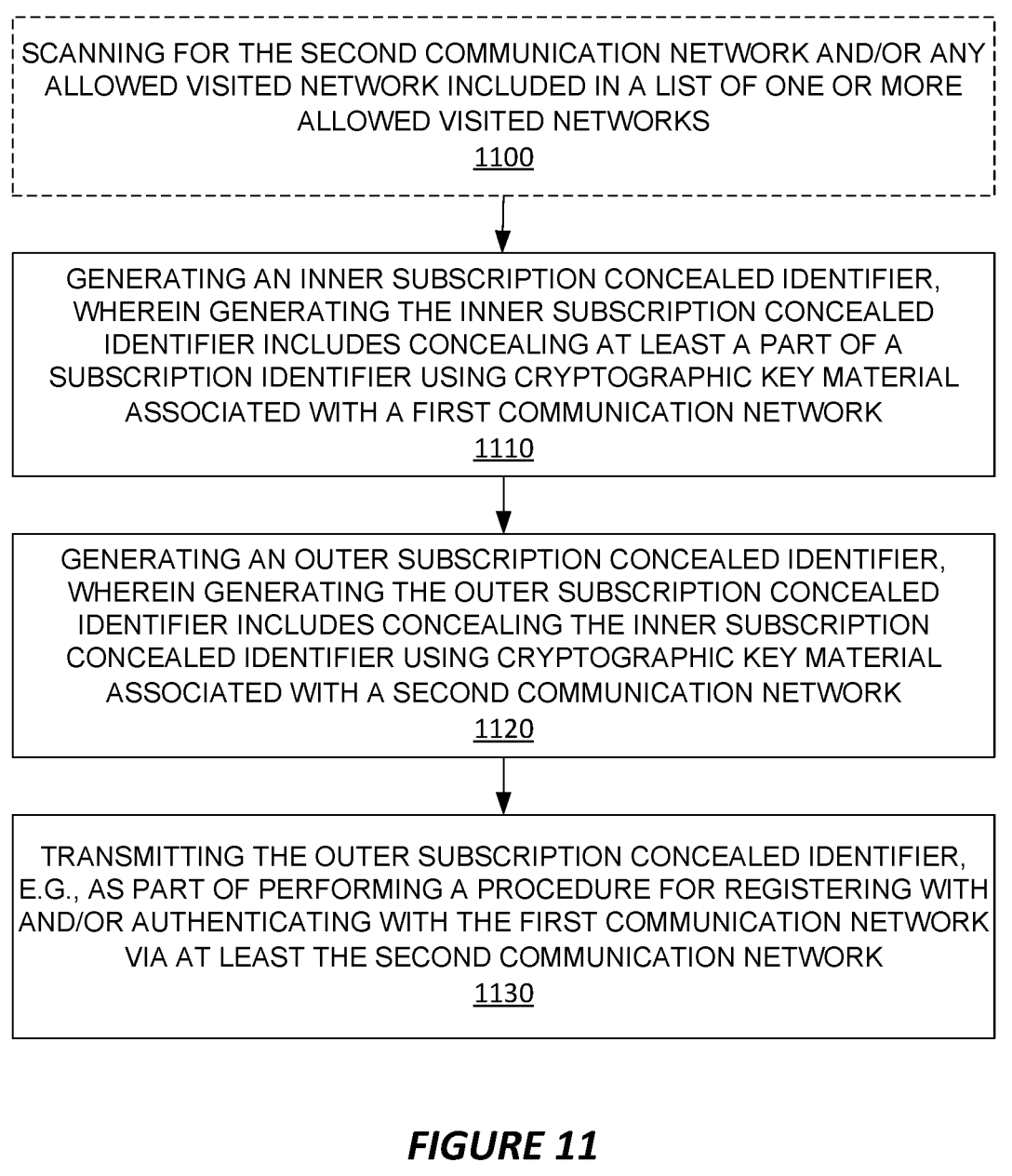

SCANNING FOR THE SECOND COMMUNICATION NETWORK AND/OR ANY ALLOWED VISITED NETWORK INCLUDED IN A LIST OF ONE OR MORE ALLOWED VISITED NETWORKS
1100

GENERATING AN INNER SUBSCRIPTION CONCEALED IDENTIFIER, WHEREIN GENERATING THE INNER SUBSCRIPTION CONCEALED IDENTIFIER INCLUDES CONCEALING AT LEAST A PART OF A SUBSCRIPTION IDENTIFIER USING CRYPTOGRAPHIC KEY MATERIAL ASSOCIATED WITH A FIRST COMMUNICATION NETWORK
1110

GENERATING AN OUTER SUBSCRIPTION CONCEALED IDENTIFIER, WHEREIN GENERATING THE OUTER SUBSCRIPTION CONCEALED IDENTIFIER INCLUDES CONCEALING THE INNER SUBSCRIPTION CONCEALED IDENTIFIER USING CRYPTOGRAPHIC KEY MATERIAL ASSOCIATED WITH A SECOND COMMUNICATION NETWORK
1120

TRANSMITTING THE OUTER SUBSCRIPTION CONCEALED IDENTIFIER, E.G., AS PART OF PERFORMING A PROCEDURE FOR REGISTERING WITH AND/OR AUTHENTICATING WITH THE FIRST COMMUNICATION NETWORK VIA AT LEAST THE SECOND COMMUNICATION NETWORK
1130

*FIGURE 11*

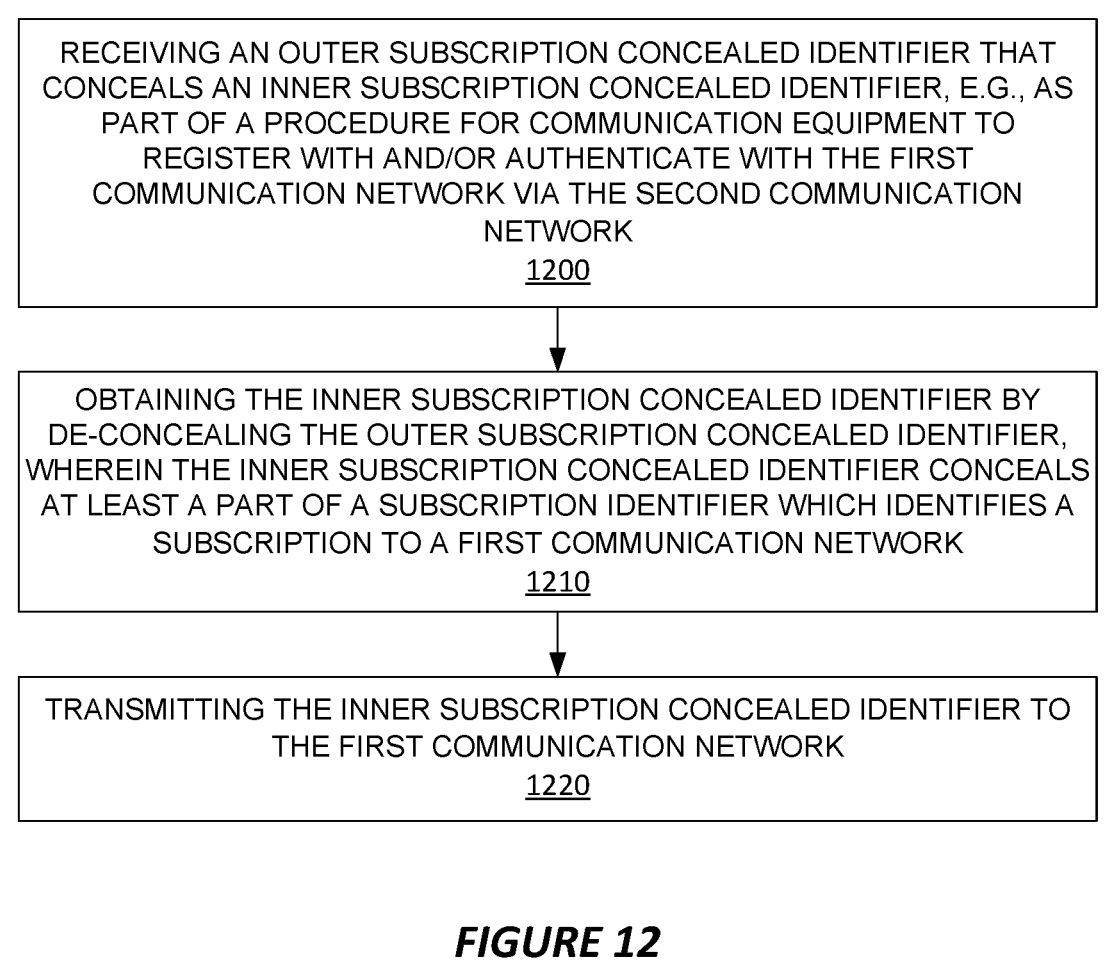

RECEIVING AN OUTER SUBSCRIPTION CONCEALED IDENTIFIER THAT CONCEALS AN INNER SUBSCRIPTION CONCEALED IDENTIFIER, E.G., AS PART OF A PROCEDURE FOR COMMUNICATION EQUIPMENT TO REGISTER WITH AND/OR AUTHENTICATE WITH THE FIRST COMMUNICATION NETWORK VIA THE SECOND COMMUNICATION NETWORK
1200

OBTAINING THE INNER SUBSCRIPTION CONCEALED IDENTIFIER BY DE-CONCEALING THE OUTER SUBSCRIPTION CONCEALED IDENTIFIER, WHEREIN THE INNER SUBSCRIPTION CONCEALED IDENTIFIER CONCEALS AT LEAST A PART OF A SUBSCRIPTION IDENTIFIER WHICH IDENTIFIES A SUBSCRIPTION TO A FIRST COMMUNICATION NETWORK
1210

TRANSMITTING THE INNER SUBSCRIPTION CONCEALED IDENTIFIER TO THE FIRST COMMUNICATION NETWORK
1220

*FIGURE 12*

SUBSCRIPTION IDENTIFIER CONCEALMENT IN A COMMUNICATION NETWORK

TECHNICAL FIELD

The present application relates generally to a communication network, and relates more particularly to concealment of a subscription identifier in such a network.

BACKGROUND

A communication network provides wireless access to communication devices via one or more cells that provide coverage over respective areas. The network to which a cell provides access (i.e., the network to which the cell is associated) may be a public network or a non-public network. A non-public network (NPN) is a network that is intended for non-public use. An NPN may for instance be intended for the sole use of a private entity such as an enterprise. Regardless, an NPN may operate with or without dependency on a Public Land Mobile Network (PLMN). Dependency on a PLMN may mean, for example, that the PLMN shares its radio access network (RAN) with the NPN.

While a communication device can access the services of an NPN through a PLMN that shares its RAN, the communication device cannot heretofore access the services of the NPN through some other PLMN. That is, the communication device cannot access the services of the NPN while roaming away from the PLMN that shares its RAN with the NPN. In these and other situations, then, a need remains for improving the roaming ability of communication devices.

SUMMARY

Some embodiments herein exploit subscription identifier concealment to, for example, expand the roaming ability of communication devices. Some embodiments in this regard conceal a subscription identifier within a hierarchy or chain of concealment layers, e.g., to reflect a chain of intermediate communication networks via which the communication device can access the services of a target communication network. When targeting the services of a non-public network (NPN), for instance, a communication device according to some embodiments herein can advantageously access the services of the NPN even when roaming away from a Public Land Mobile Network (PLMN) that shares its radio access network (RAN) with the NPN.

More particularly, embodiments herein include a method performed by communication equipment. The method includes generating an inner subscription concealed identifier. In some embodiments, generating the inner subscription concealed identifier includes concealing at least a part of a subscription identifier using cryptographic key material associated with a first communication network, e.g., a non-public network (NPN). The subscription identifier identifies a subscription to the first communication network.

The method further comprises generating an outer subscription concealed identifier. In some embodiments, generating the outer subscription concealed identifier includes concealing the inner subscription concealed identifier using cryptographic key material associated with a second communication network, e.g., a public network. In some embodiments, then, the inner subscription concealed identifier is cryptographically embedded within the outer subscription concealed identifier.

The method further comprises transmitting the outer subscription concealed identifier. In some embodiments, transmitting the outer subscription concealed identifier is performed as part of a procedure for registering with and/or authenticating with the first communication network via the second communication network.

In fact, in one or more such embodiments, transmitting the outer subscription concealed identifier is performed as part of a procedure for registering with and/or authenticating with the first communication network via both the second communication network and via a visited network different than the second communication network. In such a case, the outer subscription concealed identifier may be transmitted towards and/or be directed to the visited network. In these and other embodiments, the method may further comprise scanning for the second communication network and/or any allowed visited network included in a list of one or more allowed visited networks. Here, each of the one or more allowed visited networks is a roaming partner of the second communication network.

More particularly, in some embodiments, the outer subscription concealed identifier comprises a first outer field and a second outer field. The first outer field identifies the second communication network and is not concealed using the cryptographic key material associated with the second communication network. The second outer field includes the inner subscription concealed identifier and is concealed using the cryptographic key material associated with the second communication network.

Alternatively or additionally, in some embodiments, the inner subscription concealed identifier comprises a first inner field and a second inner field. The first inner field identifies the first communication network and is not concealed using the cryptographic key material associated with the first communication network. The second inner field includes the at least a part of the subscription identifier as concealed using the cryptographic key material associated with the first communication network.

In some embodiments, the cryptographic key material $10K$ associated with the first communication network is a public and private key pair associated with the first communication network. Alternatively or additionally, the cryptographic key material associated with the second communication network is a public and private key pair associated with the second communication network.

In some embodiments, the second communication network provides an access network for the first communication network.

In some embodiments, transmitting the outer subscription concealed identifier comprises transmitting the outer subscription concealed identifier from the communication equipment to a visited network, where the visited network is different from the second communication network.

In one embodiment, the communication equipment comprises an integrated circuit card. In this case, transmitting the outer subscription concealed identifier comprises transmitting the outer subscription concealed identifier from the integrated circuit card to a mobile equipment. The integrated circuit card may be either embedded or integrated within the mobile equipment or is configured to be removably inserted into the mobile equipment.

Embodiments herein also include a method performed by a network node. The method includes receiving an outer subscription concealed identifier that conceals an inner subscription concealed identifier. The method further comprises obtaining the inner subscription concealed identifier by de-concealing the outer subscription concealed identifier.

In some embodiments, the inner subscription concealed identifier conceals at least a part of a subscription identifier which identifies a subscription to a first communication network, e.g., a non-public network. In some embodiments, the network node is a network node (e.g., an AUSF) in a second communication network, e.g., a public network.

Regardless, the method further comprises transmitting the inner subscription concealed identifier to the first communication network.

In some embodiments, the outer subscription concealed identifier is received from a visited network that is different than the second communication network. In other embodiments, the outer subscription concealed identifier is received (directly) from a communication device.

In some embodiments, the inner subscription concealed identifier is obtained by de-concealing the outer subscription concealed identifier using cryptographic key material associated with the second communication network.

In some embodiments, obtaining the inner subscription concealed identifier is performed based on the outer subscription concealed identifier indicating that the outer subscription concealed identifier conceals a subscription identifier which identifies a subscription to the second communication network. In this case, transmitting the inner subscription concealed identifier is performed based on the inner subscription concealed identifier indicating that the inner subscription concealed identifier conceals a subscription identifier which identifies a subscription to the first communication network.

In some embodiments, the outer subscription concealed identifier comprises a first outer field and a second outer field. The first outer field identifies the second communication network and is not concealed. The second outer field includes the inner subscription concealed identifier and is concealed. In one embodiment, the second outer field is concealed using cryptographic key material associated with the second communication network.

In some embodiments, the inner subscription concealed identifier comprises a first inner field and a second inner field. The first inner field identifies the first communication network and is not concealed. The second inner field includes the at least a part of the subscription identifier as concealed.

In some embodiments, the outer subscription concealed identifier is received in a message as part of a procedure for communication equipment to register with and/or authenticate with the first communication network via the second communication network. In this case, transmitting the inner subscription concealed identifier comprises forwarding the message to the first communication network with the inner subscription concealed identifier in place of the outer subscription concealed identifier.

In some embodiments, the second communication network provides an access network for the first communication network.

Embodiments herein also include corresponding apparatuses. Embodiments herein for instance include communication equipment, e.g., comprising communication circuitry and processing circuitry. The communication equipment is configured to generate an inner subscription concealed identifier. In some embodiments, generating the inner subscription concealed identifier includes concealing at least a part of a subscription identifier using cryptographic key material associated with a first communication network, e.g., a non-public network (NPN). The subscription identifier identifies a subscription to the first communication network.

The communication equipment is further configured to generate an outer subscription concealed identifier. In some embodiments, generating the outer subscription concealed identifier includes concealing the inner subscription concealed identifier using cryptographic key material associated with a second communication network, e.g., a public network. In some embodiments, then, the inner subscription concealed identifier is cryptographically embedded within the outer subscription concealed identifier.

The communication equipment is also configured to transmit the outer subscription concealed identifier. In some embodiments, transmitting the outer subscription concealed identifier is performed as part of a procedure for registering with and/or authenticating with the first communication network via the second communication network.

Embodiments herein further include a network node, e.g., comprising communication circuitry and processing circuitry. The network node is configured to receive an outer subscription concealed identifier that conceals an inner subscription concealed identifier. The network node is further configured to obtain the inner subscription concealed identifier by de-concealing the outer subscription concealed identifier. In some embodiments, the inner subscription concealed identifier conceals at least a part of a subscription identifier which identifies a subscription to a first communication network, e.g., a non-public network. In some embodiments, the network node is a network node (e.g., an AUSF) in a second communication network, e.g., a public network. Regardless, the network node is also configured to transmit the inner subscription concealed identifier to the first communication network.

BRIEF DESCRIPTION OF THE DRAWINGS

FIG. 11 is a logic flow diagram of a method performed by a communication device according to some embodiments.

FIG. 12 is a logic flow diagram of a method performed by a network node according to some embodiments.

DETAILED DESCRIPTION

Figure 1:
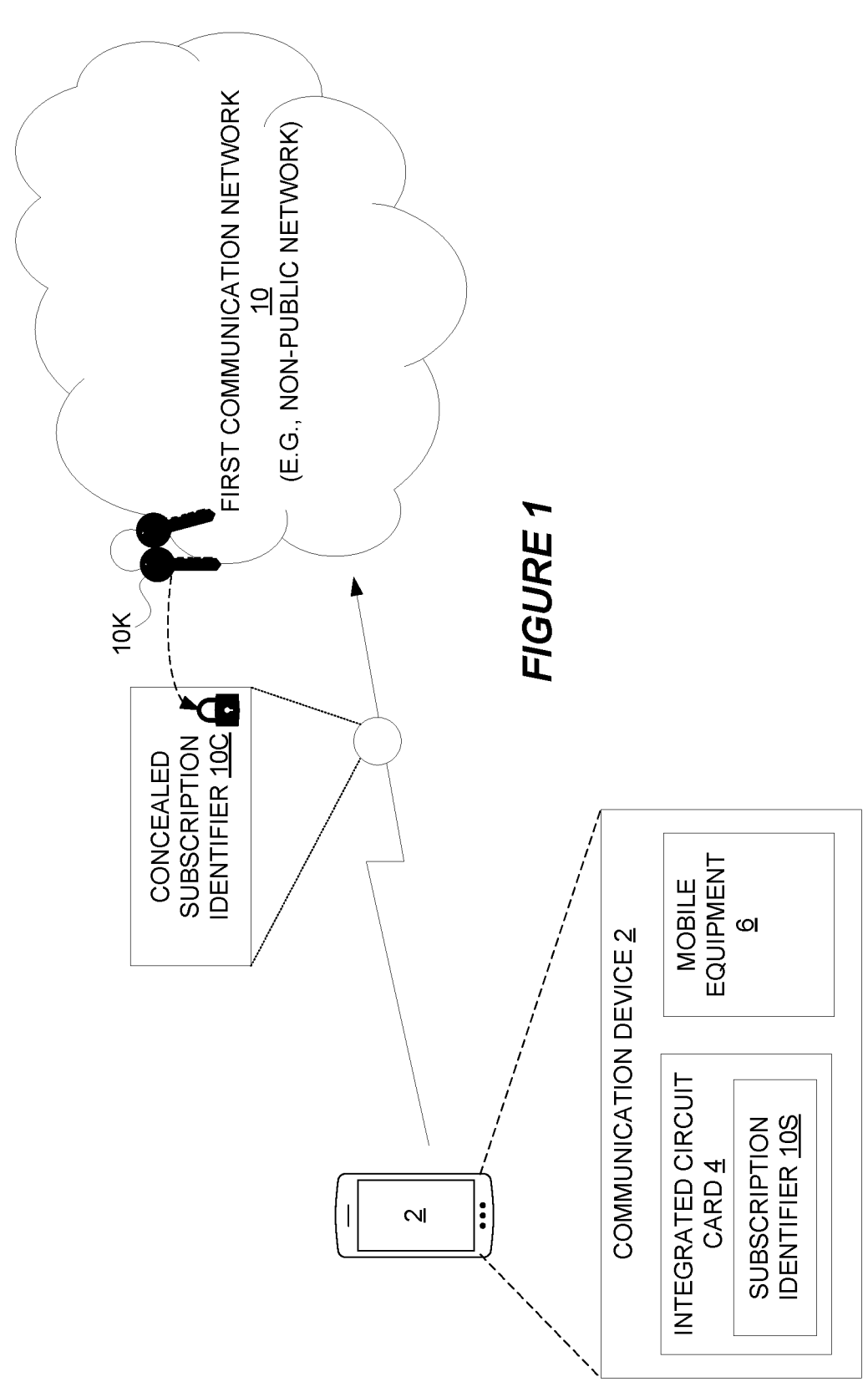
FIG. 1 is a block diagram of a communication network according to some embodiments.

FIG. 1 shows a communication device 2 configured for communication. In some embodiments, the communication device 2 is a wireless communication device configured for wireless communication. As shown in FIG. 1, for example, the communication device is exemplified as a user equipment (UE) or mobile device.

In any event, the communication device 2 is associated with a subscription to a first communication network 10. FIG. 1 depicts this association as being by way of an integrated circuit card 4 (e.g., a subscriber identity module, SIM) that is configured to be removably inserted into or embedded or integrated in the communication device 2. This integrated circuit card 4 stores in memory a subscription identifier 10S that identifies the subscription to the first communication network 10. The subscription identifier 10S may for example be an International Mobile Subscriber Identity (IMSI), a Network Access Identifier (NAI), or any other type of Subscription Permanent Identifier (SUPI). The integrated circuit card 4 may also store credentials (e.g., one or more keys) associated with the subscription identifier 10S. In other embodiments not shown, though, the subscription identifier and any associated credentials may be stored directly on the communication device 2 itself, e.g., on mobile equipment (ME) 6. Regardless of how the subscription identifier 10S is associated with the communication device 2, the communication device 2 the communication device 2 indicates the subscription identifier 10S to the first communication network 10 as part of a procedure to register with and/or authenticate itself to the first communication network 10, e.g., as a prerequisite to being provided communication service from the first communication network 10.

The communication device 2, however, conceals at least a part of the subscription identifier 10S on the radio interface, in order to avoid potentially revealing sensitive part(s) of the subscription identifier 10S to unauthorized parties.

Specifically, communication equipment 4, 6 at the communication device 2, in the form of the integrated circuit card (ICC) 4 and/or mobile equipment (ME) 6, generates a so-called concealed subscription identifier 100, e.g., a Subscription Concealed Identifier (SUCI). The communication equipment 4, 6 generates the concealed subscription identifier 10C by concealing at least a part of the subscription identifier 10S using cryptographic key material 10K associated with the first communication network 10. Such concealment may for instance entail encrypting at least a part of the subscription identifier 10S using the cryptographic key material 10K. In some embodiments, as shown, the cryptographic key material may be included in a set of one or more keys associated with the first communication network 10. For instance, the cryptographic key material 10K may be a public and private key pair associated with the first communication network 10. In this case, the communication equipment 4, 6 conceals at least a part of the subscription identifier 10S using the public key in the pair, in such a way that the resulting concealed subscription identifier 100 can be de-concealed using the private key from that pair. Regardless, concealment using the cryptographic key material 10K means that only the first communication network 10 can de-conceal the concealed part(s) of the concealed subscription identifier 10C. Accordingly, rather than transmitting the subscription identifier 10S itself in plain text, the communication device 2 transmits the concealed subscription identifier 10C over the radio interface to the first communication network 10 and the first communication network 10 recovers the subscription identifier 10S by de-concealing the concealed subscription identifier 100.

Figure 2A:
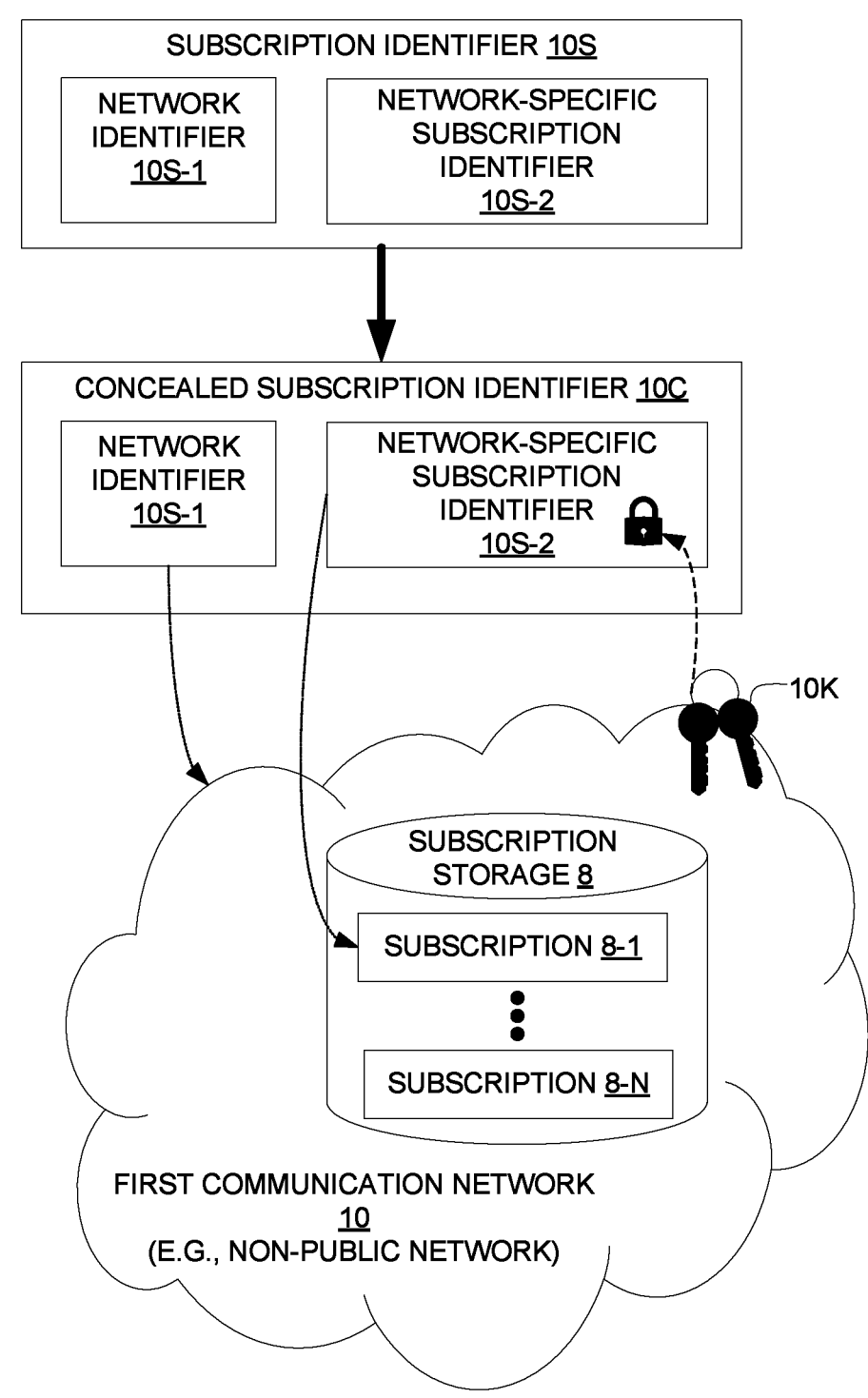
FIGS. 2A and 2B are block diagrams of subscription identifier concealment according to some embodiments.

More specifically in this regard, FIG. 2A shows additional details on how the communication equipment 4, 6 generates the concealed subscription identifier from the subscription identifier 10S according to some embodiments. As shown, the subscription identifier 10S include both a network identifier 10S-1 and a network-specific subscription identifier 10S-2. The network identifier 10S-1 identifies a specific communication network whereas the network-specific subscription identifier 10S-2 identifies a specific subscription within that specific communication network. As shown in FIG. 2A, for example, the first communication network 10 maintains multiple subscriptions 8-1 . . . 8-N in subscription storage, e.g., a Unified Data Management (UDM) node. Each subscription 8-1 . . . 8-N is identified by a respective subscription identifier. The subscription associated with the communication device 2 is shown in this example as being subscription 8-1. Accordingly, the subscription identifier 10S for the communication device 2 includes a network identifier 10S-1 that identifies the first communication network 10 and a network-specific subscription identifier 10S-2 that identifies subscription 8-1 within the first communication network 10. For instance, in some embodiments where the subscription identifier 10S is an International Mobile Subscriber Identity (IMSI), the network identifier 10S-1 may be a combination of a Mobile Country Code (MCC) and a Mobile Network Code (MNC), and the network-specific subscription identifier 10S-2 may be a Mobile Subscription Identification Number (MSIN).

Figure 2B:
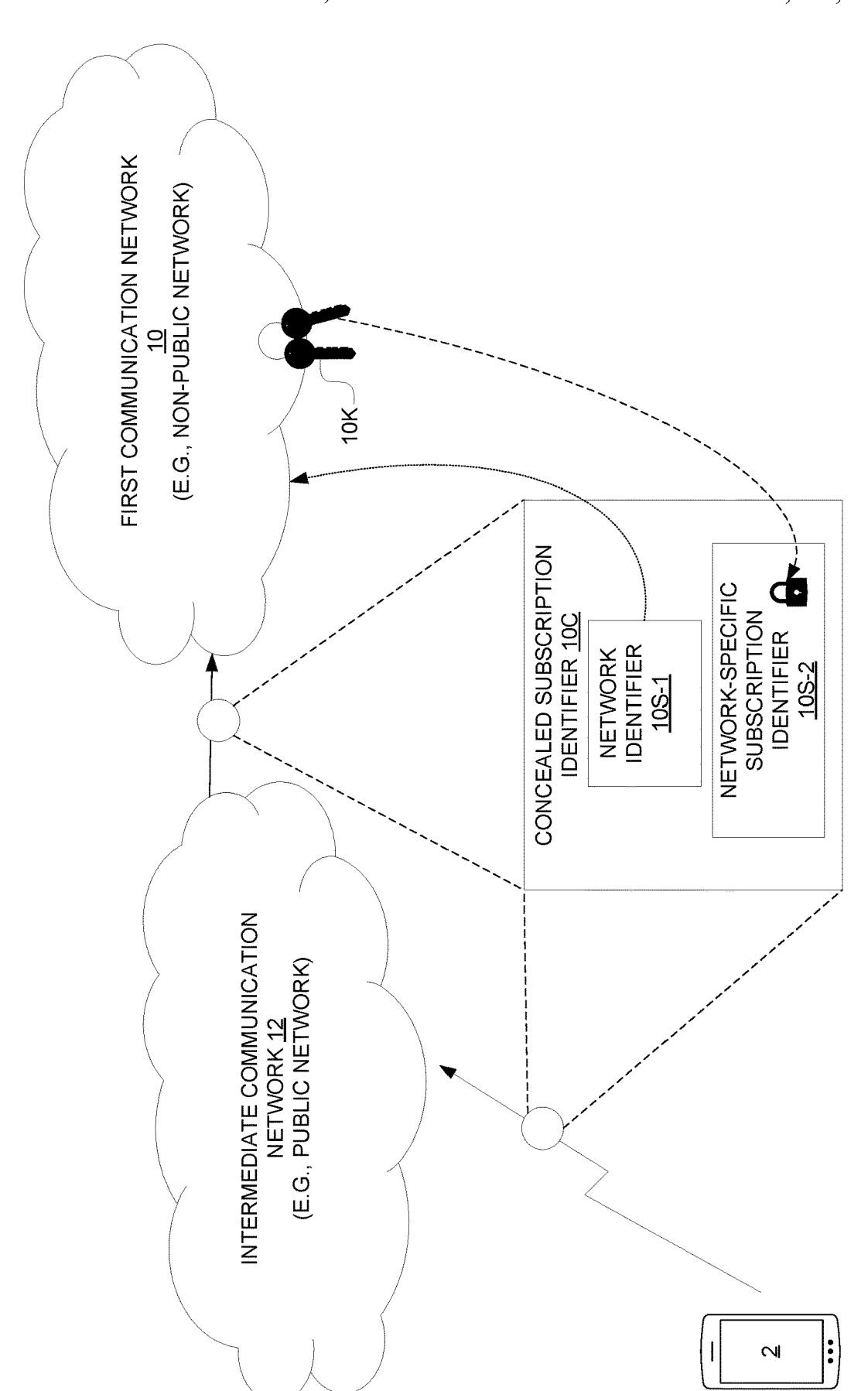

In any event, FIG. 2A shows that the communication equipment 4, 6 generates the concealed subscription identifier 10C by selectively concealing the network-specific subscription identifier 10S-2 using the cryptographic key material 10K. The communication equipment 4, 6 refrains from concealing the network identifier 10S-1. In some embodiments, for instance, the concealed subscription identifier 100 has a first field and a second field, where the first field includes or otherwise indicates the network identifier 10S-1 and is not concealed using the cryptographic key material 10K, and where the second field includes or otherwise indicates the network-specific subscription identifier 10S-2 as concealed using the cryptographic key material 10K. Selectively concealing the network-specific subscription identifier 10S-2 but not the network identifier 10S-1 in this way enables the communication device 2 to register with and/or authenticate itself to the first communication network 10 even when roaming away from the first communication network 10. FIG. 2B shows an example.

In FIG. 2B, an intermediate communication network 12 provides radio access to the communication device 2. The communication device 2 can nonetheless still register with and/or authenticate itself to the first communication network 10 by transmitting the concealed subscription identifier 100 to the intermediate communication network 12. Because the network identifier 10S-1 remains unconcealed, the intermediate communication network 12 can identify the first communication network 10 as being the network with which the concealed subscription identifier 100 is associated. The intermediate communication network 12 can then route the concealed subscription identifier 100 to the first communication network 10, e.g., so that the first communication network 10 can register and/or authenticate the communication device 2 based on the identified subscription. And because the network-specific subscription identifier 10S-2 remains concealed using the cryptographic key material 10K associated with the first communication network 10, this does not reveal the network-specific subscription identifier 10S-2 to the intermediate communication network 12 or any unauthorized party on the route to the first communication network 10.

Notably, some embodiments herein extend this subscription identifier concealment in such a way that enables the concealed subscription identifier 100 to be routed to the first communication network 10 via a chain of multiple intermediate communication networks. Some embodiments do so by concealing the subscription identifier 10S within a hierarchy or chain of concealment layers, e.g., one layer for the first communication network 10 and one or more additional layers for one or more intermediate communication networks other than the intermediate communication network providing radio access to the communication device 2. These and other embodiments may thereby advantageously expand the roaming ability of the communication device 2, without compromising concealment of the subscription identifier 10S.

Figure 3:
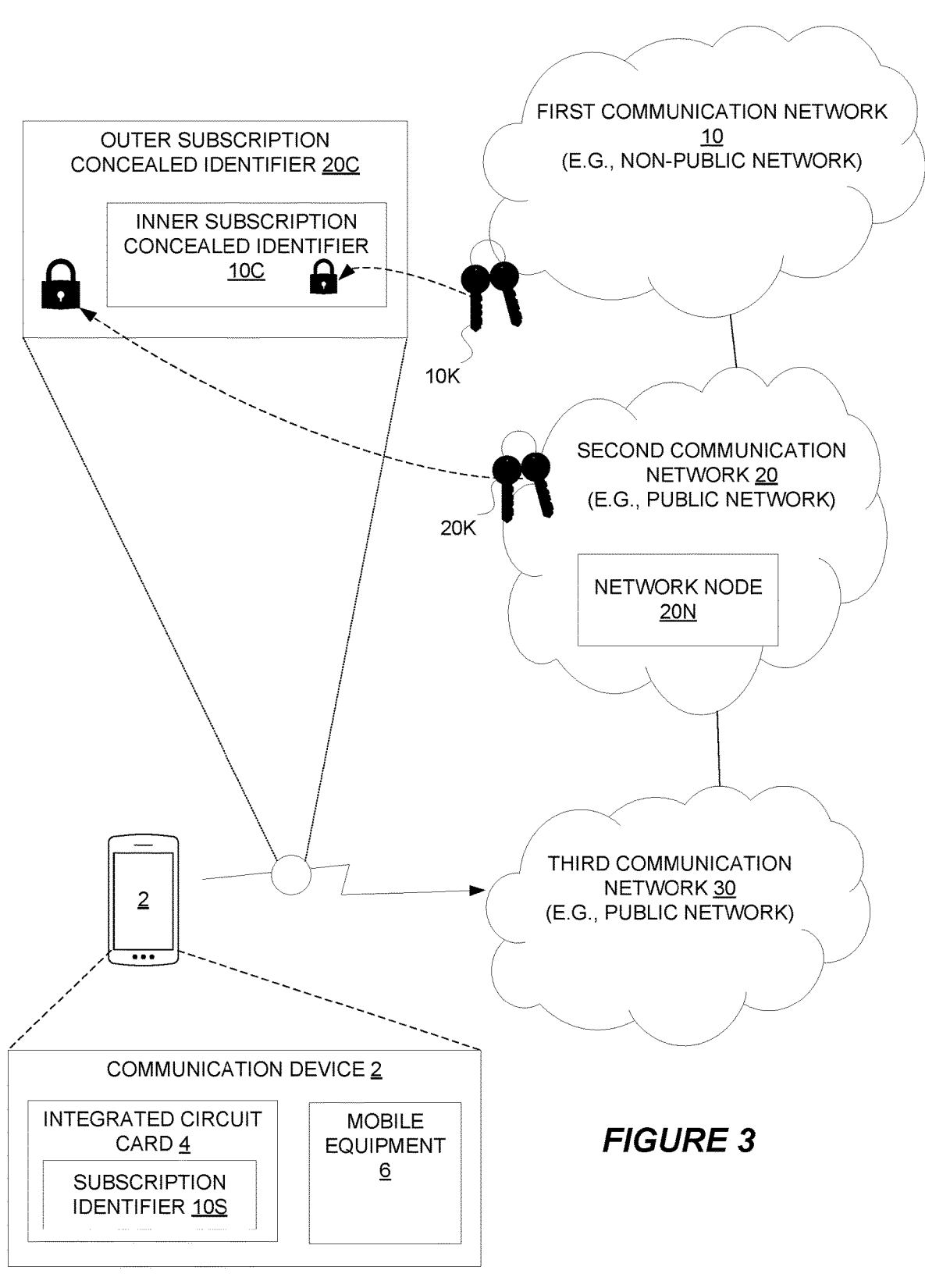
FIG. 3 is a block diagram of hierarchical subscription identifier concealment according to some embodiments.

FIG. 3 illustrates one or more of these embodiments in the context of an example where the communication device 2 accesses the first communication network 10 via multiple intermediate communication networks, namely a second communication network 20 and a third communication network 30. In FIG. 3, the subscription concealed identifier 100 is referred to as an inner subscription concealed identifier 100. This is because the communication equipment 4, 6 in these embodiments generates the subscription concealed identifier 100 as described above, but effectively wraps or embeds the subscription concealed identifier 100 within another layer of concealment. In particular, the communication equipment 4, 6 generates the concealed subscription identifier 100 by concealing at least a part of the subscription identifier 10S using the cryptographic key material associated with the first communication network 10, as described above. The communication equipment 4, 6 then generates an outer subscription concealed identifier 20C from the inner subscription concealed identifier 100. The communication equipment 4, 6 does so by concealing the inner subscription concealed identifier 10C using cryptographic key material 20K associated with the second communication wireless network 20. In some embodiments, as shown, the cryptographic key material 20K may be included in a set of one or more keys associated with the second communication network 20. For instance, the cryptographic key material 20K may be a public and private key pair associated with the second communication network 20. In this case, the inner subscription concealed identifier 100 may be concealed using the public key in the pair, in such a way that the resulting outer subscription concealed identifier 20C can be de-concealed using the private key from that pair.

Regardless, the inner subscription concealed identifier 100 is thereby embedded and concealed within the outer subscription concealed identifier 20C, so that the subscription identifier 10S is effectively concealed within a hierarchy or chain of concealment layers. In some embodiments where the outer and inner subscription concealed identifiers are each a Subscription Concealed Identifier (SUCI), such as specified by 5G standards, embodiments herein exploit an inner SUCI embedded within an outer SUCI, i.e., a SUCI within a SUCI.

The communication device 2 in FIG. 3 transmits this outer subscription concealed identifier 20C, as opposed to transmitting the subscription concealed identifier 100 itself. With the outer subscription concealed identifier 20C generated as described above, the inner subscription concealed identifier 100 can be routed to the first communication network 10 without revealing the network-specific subscription identifier 10S-2 to any of the intermediate networks. Where the communication device 2 transmits the outer subscription concealed identifier 20C to the third communication network 30, for example, the third communication network routes the outer subscription concealed identifier 20C to the second communication network 20. As shown in FIG. 3, for instance, a network node 20N in the second communication network 20 receives the outer subscription concealed identifier 20C. The second communication network 20 (e.g., the network node 20N therein) in turn routes the inner subscription concealed identifier 100 to the first communication network 10, e.g., after de-concealing the outer subscription concealed identifier 20C or otherwise extracting the inner subscription concealed identifier 10C therefrom. Some embodiments thereby enable appropriate subscription identifier routing even in cases where the communication device 2 roams such that the communication device 2 accesses the first communication network 10 via multiple intermediate networks.

Figure 4A:
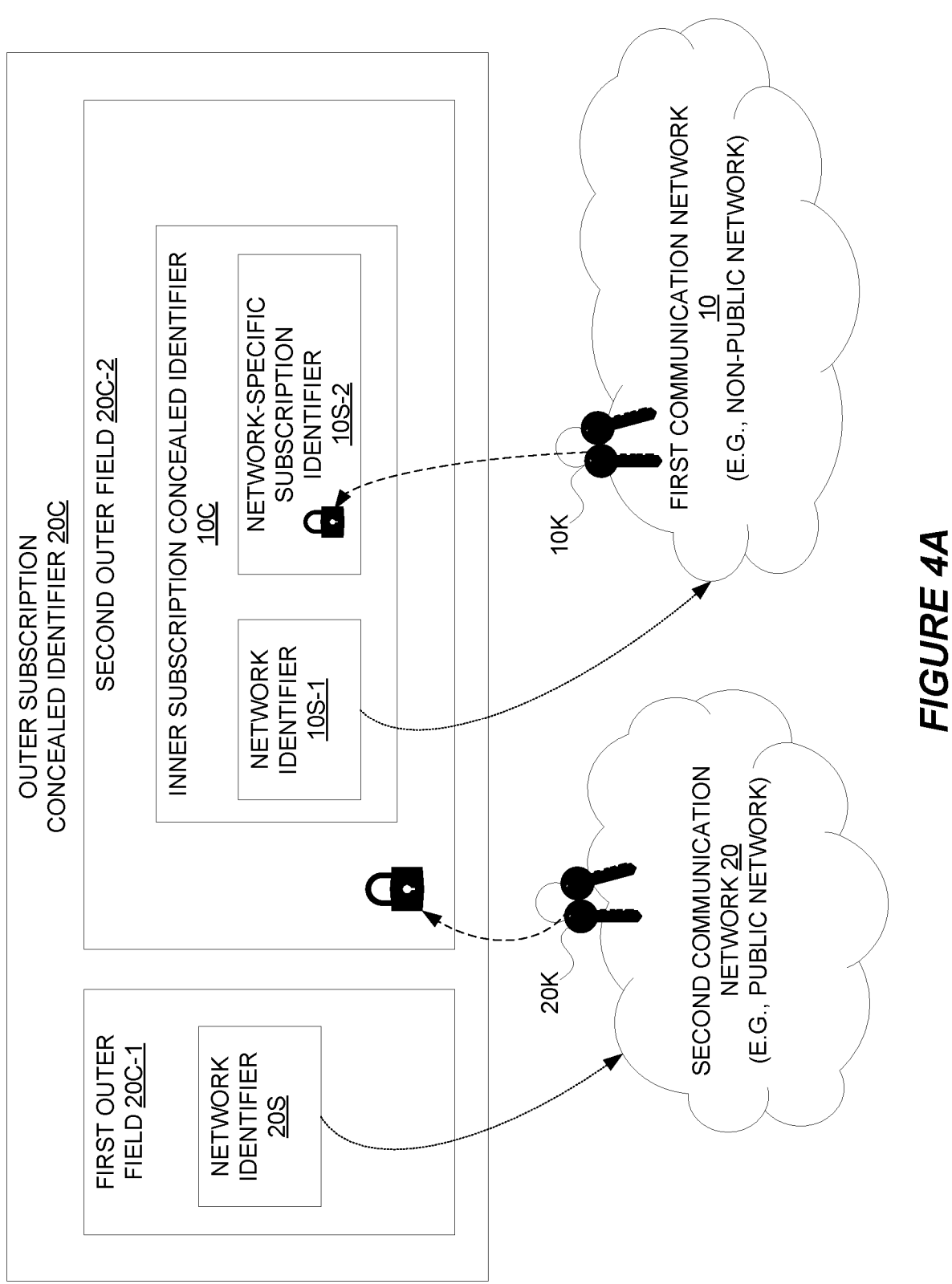
FIG. 4A is a block diagram of generation of an outer subscription concealed identifier from an inner subscription concealed identifier according to some embodiments.
Figure 4B:
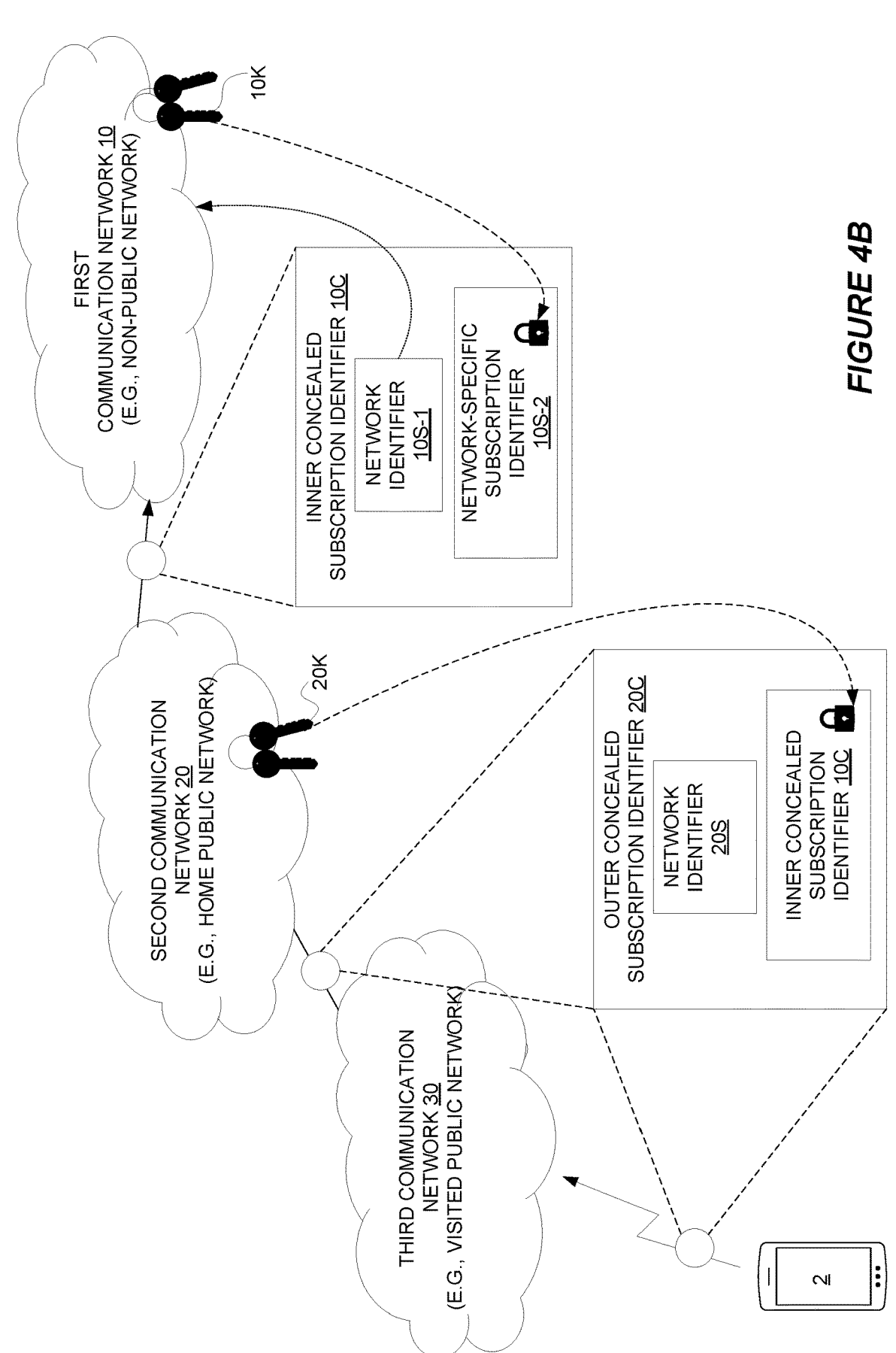
FIG. 4B is a block diagram of routing of the outer subscription concealed identifier and the inner subscription concealed identifier according to some embodiments.

FIGS. 4A-4B illustrate additional details in this regard. As shown in FIG. 4A, the inner subscription identifier 100 is generated in the same way as described above in FIGS. 2A-2B, i.e., by selectively concealing the network-specific subscription identifier 10S-2 using cryptographic key material 10K associated with the first communication network 10. The network identifier 10S-1 that identifies the first communication network 10 is not concealed using the cryptographic key material 10K. The outer subscription concealed identifier 20C is then generated from the inner subscription concealed identifier 100. In particular, the communication equipment 4, 6 generates the outer subscription concealed identifier 20C to include a first outer field 20C-1 and a second outer field 20C-2. The first outer field 20C-1 includes or otherwise indicates a network identifier 20S that identifies the second communication network 20. The second outer field 20C-2 includes or otherwise indicates the inner subscription concealed identifier 100. The communication equipment 4, 6 selectively conceals the second outer field 20C-2 using cryptographic key material 20K associated with the second communication network 20, without concealing the first outer field 20C-1 using that cryptographic key material 20K. This effectively means the inner subscription concealed identifier 100 as a whole is concealed with the cryptographic key material 20K, but the network identifier 20S is not.

As shown in the example of FIG. 4B, then, the communication device 2 transmits the outer concealed subscription identifier 20C to the third communication network 30. Because the network identifier 20S indicated by the outer concealed subscription identifier 20C is not concealed, the third communication network 30 is able to inspect the network identifier 20S and determine that the outer concealed subscription identifier 20C is associated with the second communication network 20. And because the inner concealed subscription identifier 100 is concealed, some embodiments enable the third communication network 30 to determine this without revealing the inner concealed subscription identifier 10C to the third communication network 30. Having determined that the outer concealed subscription identifier 20C is associated with the second communication network 20, the third communication network 30 accordingly routes the outer concealed subscription identifier 20C to the second communication network 20.

The second communication network 20 correspondingly inspects the network identifier 20S and determines that the outer concealed subscription identifier 20C is associated with its own network. Based on this, the second communication network 20 de-conceals the outer concealed subscription identifier e.g., by decrypting the second outer field 20C-2 in FIG. 4A. The second communication network 20 next inspects the network identifier 10S-1 indicated by the now-revealed inner concealed subscription identifier 100. Because the network identifier 10S-1 indicates the inner concealed subscription identifier 100 is associated with the first communication network 10, the second communication network 20 routes the inner concealed subscription identifier 100 to the first communication network 10. That is, rather than forwarding the outer concealed subscription identifier 20C to the first communication network 10, the second communication network 20 de-conceals the outer concealed subscription identifier and selectively routes to the first communication network 10 the inner concealed subscription identifier 100 that is embedded within the outer concealed subscription identifier 20C.

The first communication network 10 therefore receives the inner concealed subscription identifier 100. The first communication network 10 in turn inspects the network identifier 10S-1 and determines that the inner concealed subscription identifier 100 is associated with its own network. The first communication network correspondingly de-conceals the inner concealed subscription identifier 100. The first communication network 10 may do so by decrypting the network-specific subscription identifier 10S-2 using cryptographic key material 10K associated with the first communication network 10. The first communication network 10 may then perform one or more actions based on the network-specific subscription identifier e.g., as part of a procedure for registering or authenticating the communication device 2 with the first communication network 10.

Although FIG. 4B showed as an example a scenario where the third communication network 30 is the network that provides radio access to the communication device 2, it may be the second communication network 20 in other scenarios that directly provides radio access to the communication device 2. As one option in these scenarios, the communication device 2 transmits the outer concealed subscription identifier 20C to the second communication network 20 directly, rather than via the third communication network 30. The second communication network 20 may then handle the outer concealed subscription identifier 20C in the same way as described above, i.e., de-conceal the outer concealed subscription identifier 20C using the cryptographic key material 20K and route the inner concealed subscription identifier 100 to the first communication network 10. As another option in these scenarios, by contrast, the communication device 2 can just transmit the inner concealed subscription identifier 10C to the second communication network 20, rather than transmitting the outer concealed subscription identifier 20C.

Regardless, the embodiments above may thereby enable the communication device 2 to roam away from the first communication network 10 and access the first communication network 10 via one or more intermediate networks. In fact, where the first communication network 10 is a non-public network (NPN), some embodiments effectively enable the communication device 2 to roam away from an NPN yet still access, register, and/or authenticate to the NPN via one or more intermediate networks, e.g., even without a subscription to the one or more intermediate networks themselves. Authentication by the NPN may for instance be performed using an Extensible Authentication Protocol (EAP) based authentication method, e.g., such that a certificate may be used instead of traditional SIM credentials. In these and other embodiments, the authentication procedure may be run between the communication device 2 and the NPN 10 through the one or more intermediate networks.

More particularly, an NPN as used herein is a network intended for non-public use. An NPN may for example be a network that is at least partly private. An NPN may thereby have one or more parts in an isolated network deployment that does not interact with a public network. At least one or more parts of an NPN may for example be operated by a private network operator which only allows certain pre-registered clients to attach to it. In some embodiments, though, some network functionality may be provided by a public network operator. For example, some network functionality, such as radio access and/or the control plane, may be provided by a public network operator, e.g., as a service for the private network operator.

As a particular concrete use case, an NPN may be a so-called standalone NPN (SNPN). In some embodiments, all functionality of the SNPN is provided by a private network operator. In other embodiments, all functionality of the SNPN except for radio access is provided by a private network operator, with radio access being provided by (e.g., shared with) a public network operator. The public network in this case may advertise a so-called network identifier (NID) of the NPN over the radio interface, so that communication devices can discover the NID and know that the NPN can be accessed via the public network. In some embodiments, globally unique NIDs identify different NPNs, whereas in other embodiments different combinations of PLMN IDs and NIDs identify different NPNs. An SNPN in either case may for example be a smart factory network that uses an intermediate private or public 5G network for radio access.

Regardless, FIG. 4B shows that in some embodiments the first communication network 10 is an NPN 10 and the second communication network 20 is a public network that provides an access network for the first communication network 10, e.g., according to a business agreement between the first and second communication network operators. The second communication network 20 may in this case be referred to as a home public network 20 (e.g., home public land mobile network, HPLMN) of the communication device 2, with respect to the NPN 10. The home public network 20 may in some cases even advertise, over at least a part of its coverage area, an NID of the NPN 10, e.g., which may be all or part of the network identifier 10S-1. In one or more of these embodiments, the communication device 2 may be preconfigured with information about the home public network 20, e.g., PLMN ID and cryptographic key material 20K. The communication device 2 may in this case be configured to scan for the home public network 20, based on the understanding that the home public network 20 provides radio access for the NPN When the communication device 2 discovers the home public network 20, in conjunction with the NID being advertised by the NPN 20, the communication device 2 can attempt to access the NPN 10 via the home public network 20. For example, the communication device 2 can perform a procedure to register with and/or authenticate itself to the NPN 10, via the home public network 20. This procedure may involve transmitting the outer subscription concealed identifier 20C to the home public network 20.

Notably, FIG. 4B also shows that embodiments herein enable the communication device 2 to access, register with, and/or authenticate to the NPN 10 even when roaming away from the home public network 20. FIG. 4B in this regard shows that the third communication network 30 may be another public network that is a roaming partner of the home public network 20, e.g., according to a business agreement. The third communication network 30 is therefore referred to as a visited public network 30. This visited public network 30 may provide radio access to the communication device 2 when the communication device 2 is outside of the geographical area(s) within which the home public network 20 provides radio coverage and/or advertises the NID of the NPN 10. Indeed, the communication device 2 according to some embodiments may scan not only for the home public network 20, but also scan for the visited public network 30. The visited public network 30 may for example be included in a list at the communication device 2 that indicates one or more allowed visited networks, e.g., that are each a roaming partner of the home public network 20. That is, the communication device 2 may be preconfigured with information about the roaming partner(s) of the home public network 20. If the communication device 2 discovers the visited public network 30, the communication device 2 may transmit the outer concealed subscription identifier 20C to the visited public network 30, e.g., as part of a procedure for registering with and/or authenticating with the NPN 10 via the home public network 20 and the visited public network 30. In this case, then, the authentication procedure between the communication device 2 and the NPN 2 is performed through both the home public network 20 and the visited public network 30. As part of the registration procedure, for example, the NPN 10 may share or otherwise provide to the home public network 20 and/or the visited public network 30 the subscription identifier 10S that results after deconcealment. The subscription identifier 10S may then be used in key derivation.

Figure 5A:
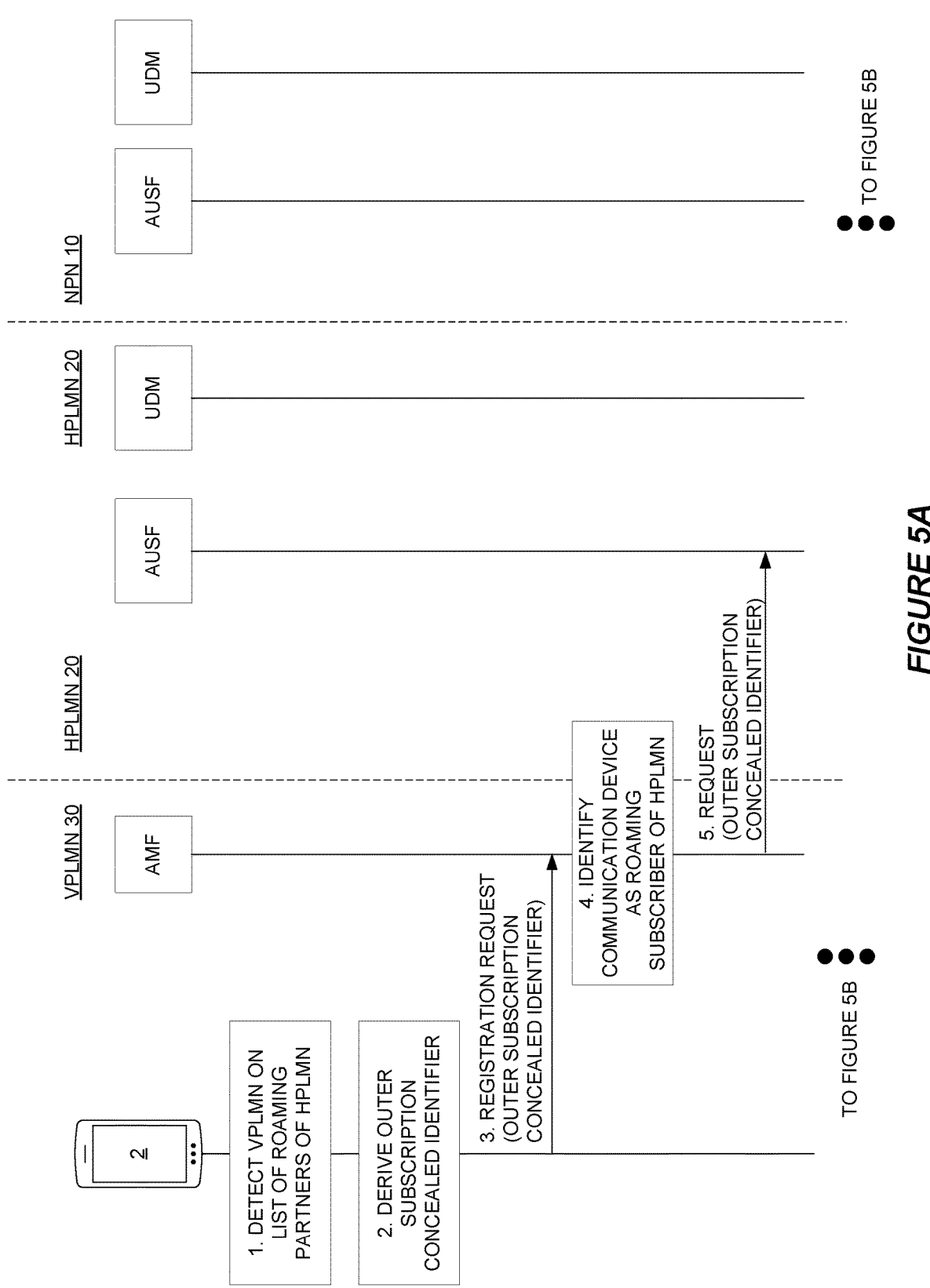
FIG. 5A-5B are call flow diagrams of a procedure for registering with and/or authenticating to a non-public network via a home PLMN and a visited PLMN, using an outer subscription concealed identifier, according to some embodiments.
Figure 5B:
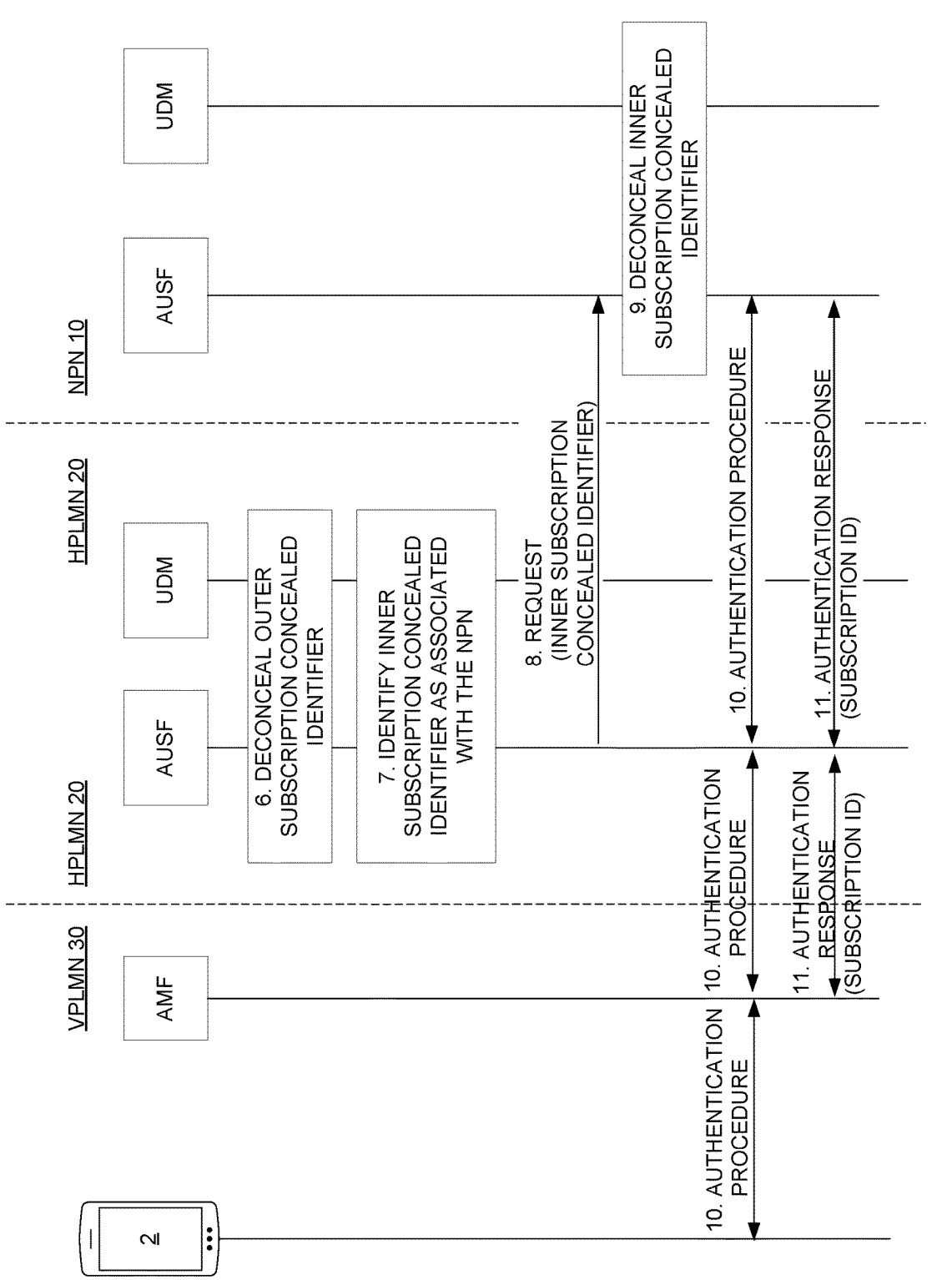

FIG. 5A-5B show a specific call flow for registration of the communication device 2 with the NPN 10 via the HPLMN 20 and VPLMN 30 according to some embodiments. As shown in FIG. 5A, the communication device 2 wants to connect to the NPN 10, but cannot see the NID of the NPN 10 being broadcasted. But the communication device 2 does detect the VPLMN 30, which is on a list of roaming partners of the HPLMN 20 for the NPN 10 (Step 1). Accordingly, if not previously derived, the communication device 2 derives the outer subscription concealed identifier 20C as described above, using the inner subscription concealed identifier as well as the cryptographic key material 10K, 20K associated with the HPLMN and NPN 10 (Step 2). In one example, the cryptographic key material 10K is a public and private key pair associated with the NPN 10 and/or the cryptographic key material 20K is a public and private key pair associated with the HPLMN 20. Regardless, the communication device 2 then transmits a registration request to a network node in the VPLMN 30, such as an Access and Mobility Function (AMF) in the VPLMN 30, where the registration request includes the outer subscription concealed identifier 20C (Step 3).

The AMF in the VPLMN 30 inspects the outer subscription concealed identifier 20C and identifies the communication device 2 as being a roaming subscriber of the HPLMN 20 (Step 4). The AMF identifies this based on the network identifier indicated by the outer subscription concealed identifier 20C. The AMF in some embodiments may even be unaware that the communication device 2 is actually a client of the NPN 10 instead of the HPLMN 20. The AMF in the VPLMN 30 correspondingly transmits a request (e.g., an authentication request) to the HPLMN e.g., an Authentication Server Function (AUSF) in the HPLMN 20. The AUSF in the HPLMN in this case exemplifies the network node 20N in FIG. 3.

Continuing on FIG. 5B, the HPLMN 20 processes the request as the HPLMN 20 would any other request from the VPLMN 30 as a roaming partner. This includes deconcealing the outer subscription concealed identifier 20C, e.g., with the help of a Unified Data Management (UDM) function in the HPLMN 20 (Step 6). The HPLMN 20 notices that the deconcealed identifier 20C actually embeds another concealed identifier in the form of the inner subscription concealed identifier 100 that is associated with the NPN 10 (Step 7). So the HPLMN 20 (e.g., the AUSF in the HPLMN 20) transmits a request (e.g., an authentication request) to the NPN 10, e.g., an AUSF in the NPN 10 (Step 8). This request includes the inner subscription concealed identifier 100.

The NPN 10 deconceals the inner subscription concealed identifier 100 (Step 9). The AUSF in the NPN 10 may do this with the help of a UDM in the NPN Regardless, the NPN 10 does so using the cryptographic key material 10K associated with the NPN, e.g., a private key from a public and private key pair associated with the NPN 10. Such deconcealment results in the subscription identifier 10S (e.g., a Subscription Permanent Identifier, SUPI) that identifies the subscription of the communication device 2 to the NPN 10.

With the subscription identifier 10S now provided securely to the NPN 10, the NPN 10 initiates an authentication procedure via the HPLMN 20 and VPLMN 30, in order to authenticate and register the communication device 2 (Step 10). Upon successful authentication, the NPN 10 shares the subscription identifier 10S with the HPLMN 20 and VPLMN 30 (Step 11), e.g., in an authentication response.

Figure 6A:
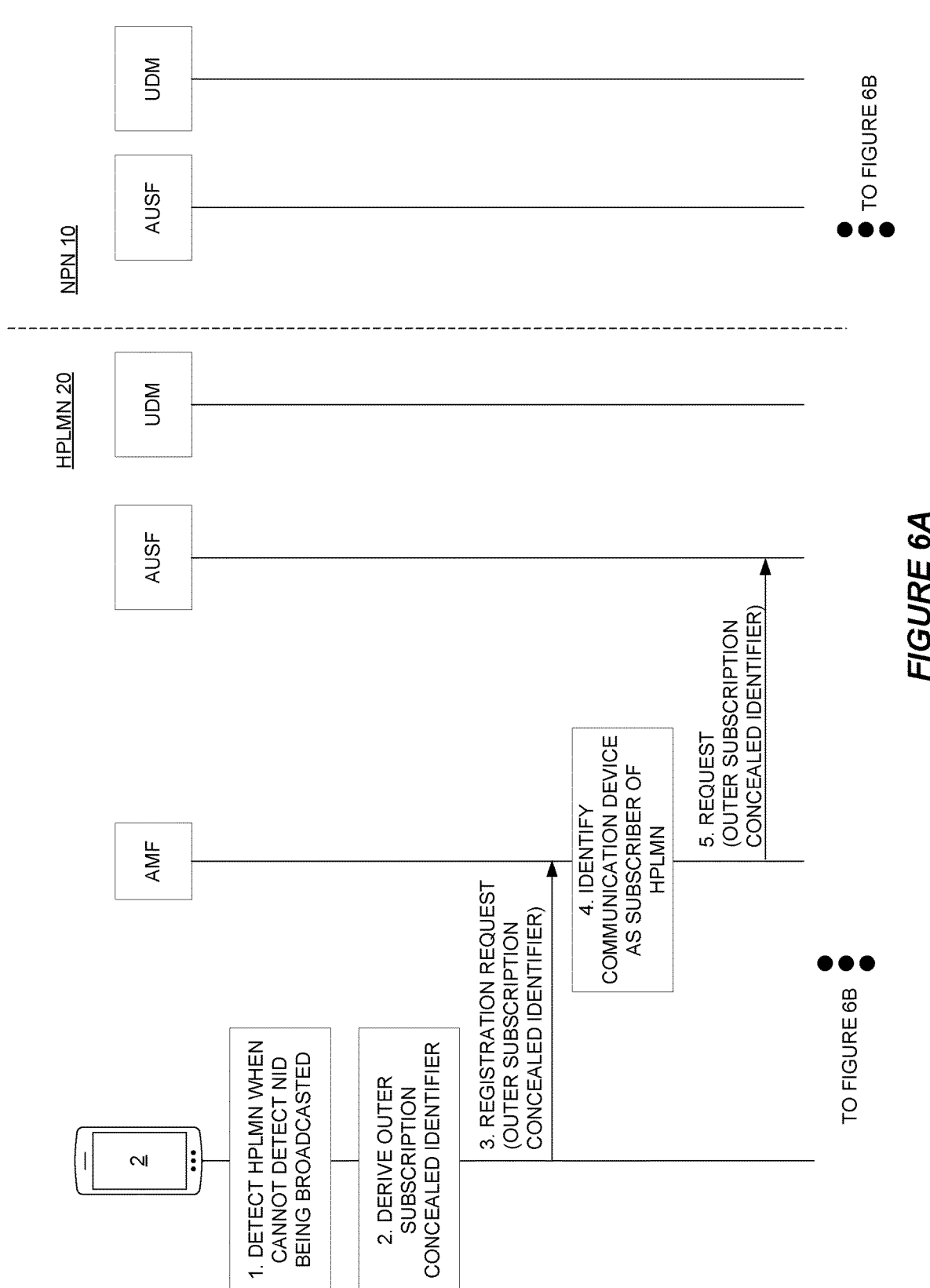
FIG. 6A-6B are call flow diagrams of a procedure for registering with and/or authenticating to a non-public network via a home PLMN, using an outer subscription concealed identifier, according to some embodiments.
Figure 6B:
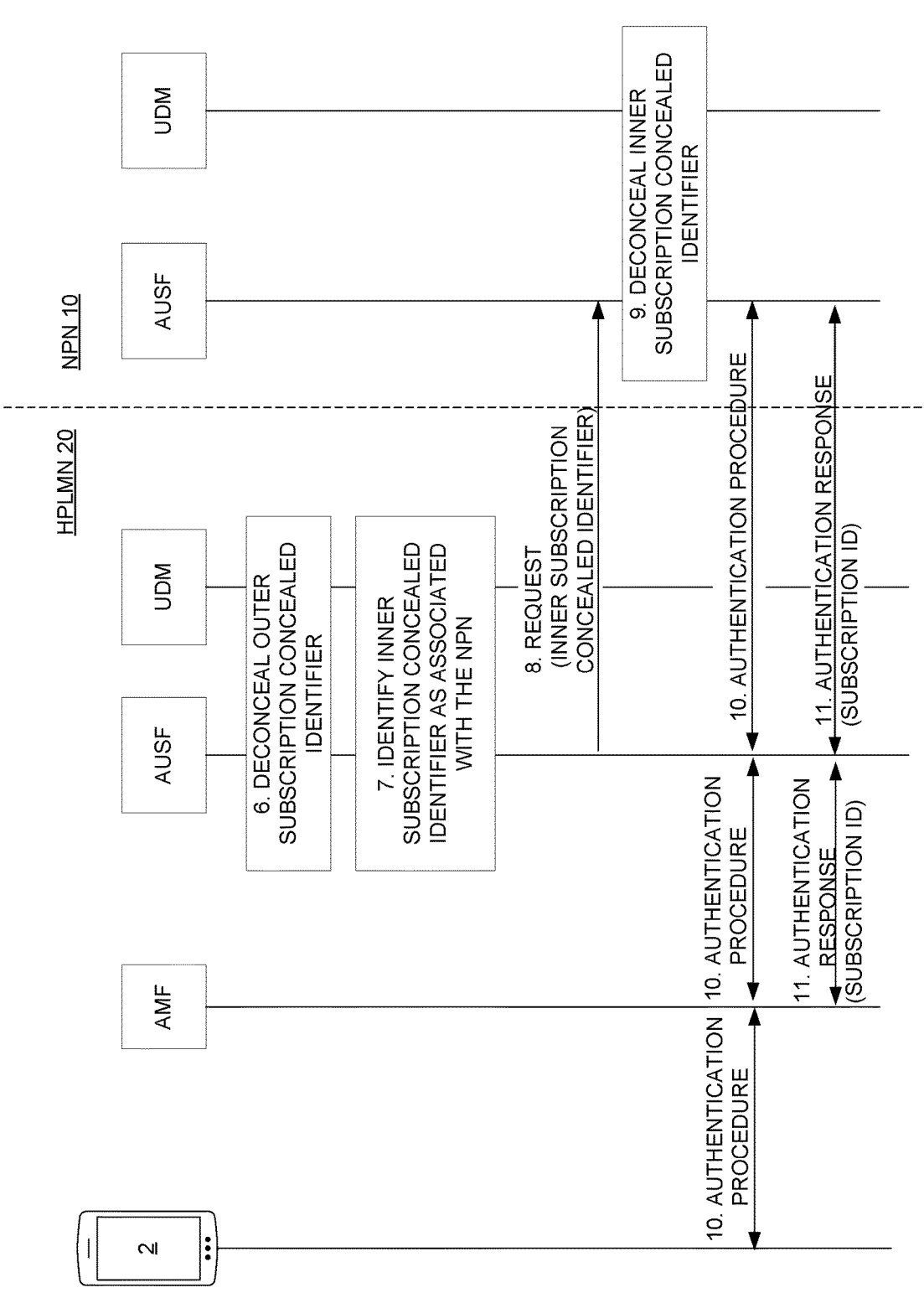

FIGS. 6A-6B illustrate a similar call flow for the scenario where the communication device 2 is within coverage of the HPLMN 20 itself, but within a region of that coverage where the HPLMN 20 does not advertise the NID of the NPN 10. The steps are the same as shown in FIGS. 5A-5B, except as follows. In Step 1, the communication device 2 sees the HPLMN and does not need to scan for or select a VPLMN from the roaming partners list. In steps 3-4, the AMF is in the HPLMN 20 instead of the VPLMN 30. The AMF in this case notices that the outer subscription concealed identifier 20C belongs to the same HPLMN and forwards it to the AUSF of the HPLMN 20 (Step 5). In FIG. 6B, the AUSF in the HPLMN 20 behaves as described above in FIG. 5B (Steps 6-11).

Accordingly, some embodiments herein make it possible for the communication device 2 to gain connectivity to the NPN 10 as long as the communication device 2 is in a location where the home public network 20 itself, or a roaming partner of the home public network 20, provides radio access coverage. Effectively, then, the communication device 2 can connect to the NPN 10 from anywhere the home public network's own customers could connect to the home public network 20, which may be more or less globally. This also means that the communication device 2 in some embodiments can get internet connectivity, e.g. when the NPN 10 provides that or via local break-out to the internet in the VPLMN or HPLMN) even in areas where the NID of the NPN 10 is not being broadcasted, and even without a separate subscription to the home public network 20. That is, a communication device with only NPN credentials can access the NPN 10 either via the NPN's access network, via the access network of the home public network with which the NPN 10 has a business and trust relationship, or via the VPLMN access network.

One use case for some embodiments is where the communication device 2, with only credentials for authenticating to the NPN 10, moves in and out of radio coverage provided by the home public network 20, e.g., areas where NID is broadcasted by the home public network 20. For example, a truck with communication capability may move between factories of a manufacturer, where the manufacturer has factory local access networks provided by the home public network 20. When out of coverage of the local access networks, the truck may also move out of coverage of the home public network in general (not only out of coverage of NI D broadcasts) and thus there would only be the access network(s) of visited public networks available. Embodiments in this case enable the truck to connect to the NPN 10 even when the truck is out of coverage of the home public network in general, i.e., only within the coverage area of a visited public network.

Figures 7, 8:
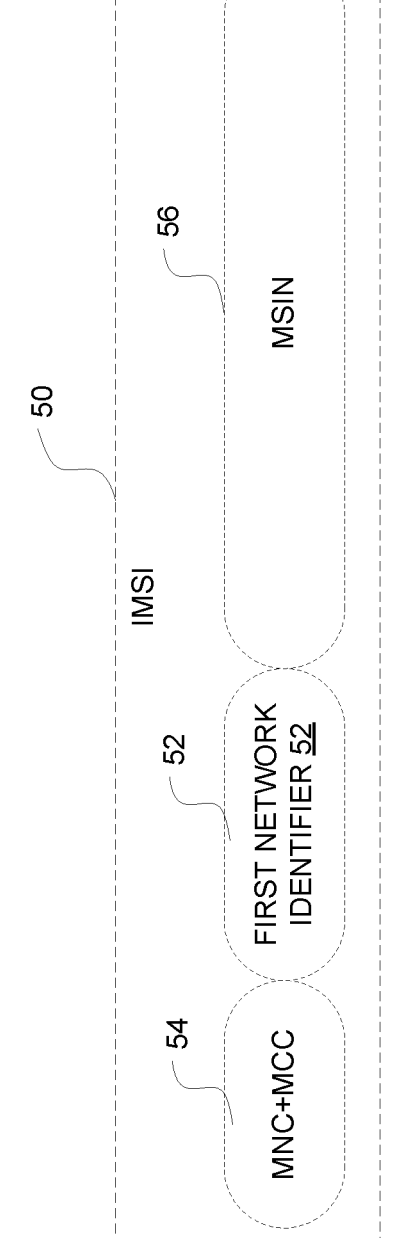
FIG. 7 is a block diagram of a subscription identifier according to some embodiments.
FIG. 8 is a block diagram of a subscription identifier in the form of an IMSI according to some embodiments.

No matter the type of network(s) to which embodiments herein are applied, the subscription identifier 10S (e.g., SUPI) may include multiple network identifiers to facilitate one or more embodiments herein. For example, as shown in FIG. 7, the subscription identifier 10S may include a first network identifier 52 that identifies the first communication network 10 and a second network identifier 54 that identifies the second communication network 20 which serves the first communication network 10. That is, the subscription identifier 10S identifies both the first communication network 10 as being the network to which the identified subscription belongs and the second communication network 20 as being the network serving the network to which the identified subscription belongs.

More particularly, FIG. 7 shows that the subscription identifier 10S in some embodiments further includes a network-specific subscription identifier 56, e.g., in the form of a Mobile Subscription Identification Number (MSIN). This network-specific subscription identifier 56 identifies a certain subscription within whatever network is identified by the first network identifier 52, i.e., the certain subscription is specific to whatever network is identified by the first network identifier 52. In the example of FIG. 7, then, because the first network identifier 52 identifies the first communication network 10, the network-specific subscription identifier 56 identifies the communication device's subscription within the first communication network 10. The combination of the first network identifier 52 and the network-specific subscription identifier 56 thereby identifies the communication device's subscription to the first communication network 10.

In addition, the second network identifier 54 identifies the communication network 20 that serves the first communication network 10, such that the subscription identifier 10S itself identifies both the first and the second networks 10, 20. In the context of the example where the second communication network 20 (e.g., a public network) shares its RAN with the first communication network 10 (e.g., an NPN), the subscription identifier 10S itself identifies both the first network (e.g., the NPN) to which the subscription relates and the network 20 (e.g., the public network) that provides radio access for the first network 10. Or, in the context of the example where the first network 10 is a mobile virtual network or network slice that uses infrastructure of the second communication network 20, the subscription identifier 10S itself identifies both the mobile virtual network or network slice to which the subscription relates and the network 20 providing infrastructure for that mobile virtual network or network slice.

By identifying both networks 10, 20, the subscription identifier 10S may efficiently support functionality and deployment scenarios beyond traditional roaming. This includes the deployment scenario enabled by some embodiments herein whereby the communication device 2 accesses the first communication network 10 via not only the second communication network 20 but also a third communication network 30. The second and third communication networks 20 and thereby form a chain of networks via which the communication device 2 authenticates its subscription to and accesses the first communication network 10. This chain may be formed by a direct roaming partnership between the second and third communication networks 20, 30, so that communication device 2 may roam to the third communication network 30 and access the second communication network via the third communication network 30. In this case, even though the third communication network 30 does not have a direct roaming partnership with the first communication network 10, the communication device 2 is still able to authorize its subscription to and access the first communication network 10 via the third communication network 30, by way of the roaming partnership between the second and third communication networks 20, 30.

In fact, where the first communication network 10 is a non-public network (NPN), some embodiments effectively enable the communication device 2 to roam away from an NPN yet still access, register, and/or authenticate to the NPN via the second and third communication networks 20, 30, e.g., even without a subscription to the networks 20, 30 themselves. Authentication by the NPN may for instance be performed using an Extensible Authentication Protocol (EAP) based authentication method, e.g., such that a certificate may be used instead of traditional SIM credentials. In these and other embodiments, the authentication procedure may be run between the communication device 2 and the NPN 10 through the networks 20, based on the transmitted subscription identifier 10S.

As this example demonstrates, some embodiments herein facilitate efficient routing of traffic to or handling of traffic for the first communication network 10, e.g., since the subscription identifier 10S itself includes information that reflects the chain of networks via which the subscription identifier 10S and any associated traffic is to be routed or handled. Moreover, by including this information in the subscription identifier 10S itself, these embodiments provide routing or handling efficiency without requiring any additional out-of-band signaling.

Consider now various examples of how the subscription identifier 10S may be structured according to various embodiments. FIG. 8 shows one example where the subscription identifier 10S is an IMSI.

As shown in FIG. 8, the subscription identifier 10S as an IMSI includes the second network identifier 54 in the form of an Mobile Network Code (MNC) and Mobile Country Code (MCC), includes the network-specific subscription identifier 56 in the form of an MSIN, and further includes the first network identifier 52. Notably in this case, then, rather than the MNC+MCC identifying the first network 10 to which the MSIN relates, the MNC+MCC identifies the second network 20 that serves the first network 10. And it is the first network identifier 52 that identifies the first network 10 to which the MSIN relates. Where the first network 10 is a network slice, for instance, the first network identifier 52 may be or correspond to a S-NSSAI identifying that network slice, e.g., such that embodiments effectively embed the S-NSSAI into the IMSI. Or where the first network 10 is a mobile virtual network, the first network identifier 52 may be or correspond to a MNC associated with that mobile virtual network, e.g., such that embodiments effectively embed the MNC into the IMSI.

In one or more embodiments, the IMSI in FIG. 8 has the same length as a legacy IMSI; namely, 14 or 15 digits, e.g., 15 digits. But the MSIN is made shorter in length than a legacy MSIN, in order to accommodate the first network identifier 52. As an example, the first network identifier 52 may be 2 or 3 digits, such that the MSIN is 7 or 8 digits rather than 9 or 10 digits. Generally in this case, then, the network-specific subscription identifier 56 (e.g., in the form of an MSIN) is indicated by 8 or less digits.

The smaller bit space for the MSIN inherently reduces the number of subscriptions that can be indicated by the MSIN in this case, in favor of encoding the first network identifier 52 into the IMSI. Nonetheless, in some embodiments, the same communication network may be allocated multiple possible values for the first network identifier 52 in order to effectively increase the number of subscriptions addressable for that network. For example, where the first network identifier 52 is 3 digits, the same network may be allocated both the value '001' and the value '002' for the first network identifier 52, so as to double the number of subscriptions addressable for the network.

Note too that, in some embodiments, the first network identifier 52 is effectively encoded into the same bits as a legacy MSIN, e.g., the first network identifier 52 occupies a bit space shared with the legacy MSIN. The IMSI would therefore still look like a legacy IMSI to any legacy communication network that is not configured to understand the first network identifier 52. The first network identifier 52 in this case would not affect legacy operation, e.g., in roaming scenarios or with legacy network infrastructure.

In other embodiments, by contrast, the IMSI in FIG. 8 is made longer than a legacy IMSI in order to accommodate the first network identifier 52 as a new, dedicated part of the IMSI. So, the IMSI has 16 or more digits, and the first network identifier 52 occupies a digit/bit space dedicated for that first network identifier 52. As an example, the first network identifier 52 may be 2 or 3 digits, while keeping the MSIN at 9 or 10 digits, making the IMSI have a length of 17 or 18 digits. The IMSI may thereby take the form MSIN.FID.MNC.MCC, where FID represents the first network identifier 52.

In yet other embodiments, rather than making the IMSI in FIG. 8 longer than a legacy IMSI, the IMSI is formed of hexadecimal values (e.g., hexadecimal digits) in order to accommodate the first network identifier 52. An IMSI in this case would comprise 15 hexadecimal values. The larger address space offered by hexadecimal values mitigates loss in subscription addressability that results from also including the first network identifier 52 as part of the IMSI. That said, some embodiments exploit hexadecimal values only for the MSIN portion and the first network identifier 52 portion of an IMSI, leaving the MNC+MCC portion with decimal digits. Indeed, since the MNC and MCC are used by a visited network to identify the home network, using decimal digits for MNC and MCC would alleviate the burden on the visited network to understand the new IMSI hexadecimal format and thereby improve interoperability. Similarly, in still other embodiments, the IMSI may be formed of characters in order to accommodate the first network identifier 52.

Figures 9A, 9B:
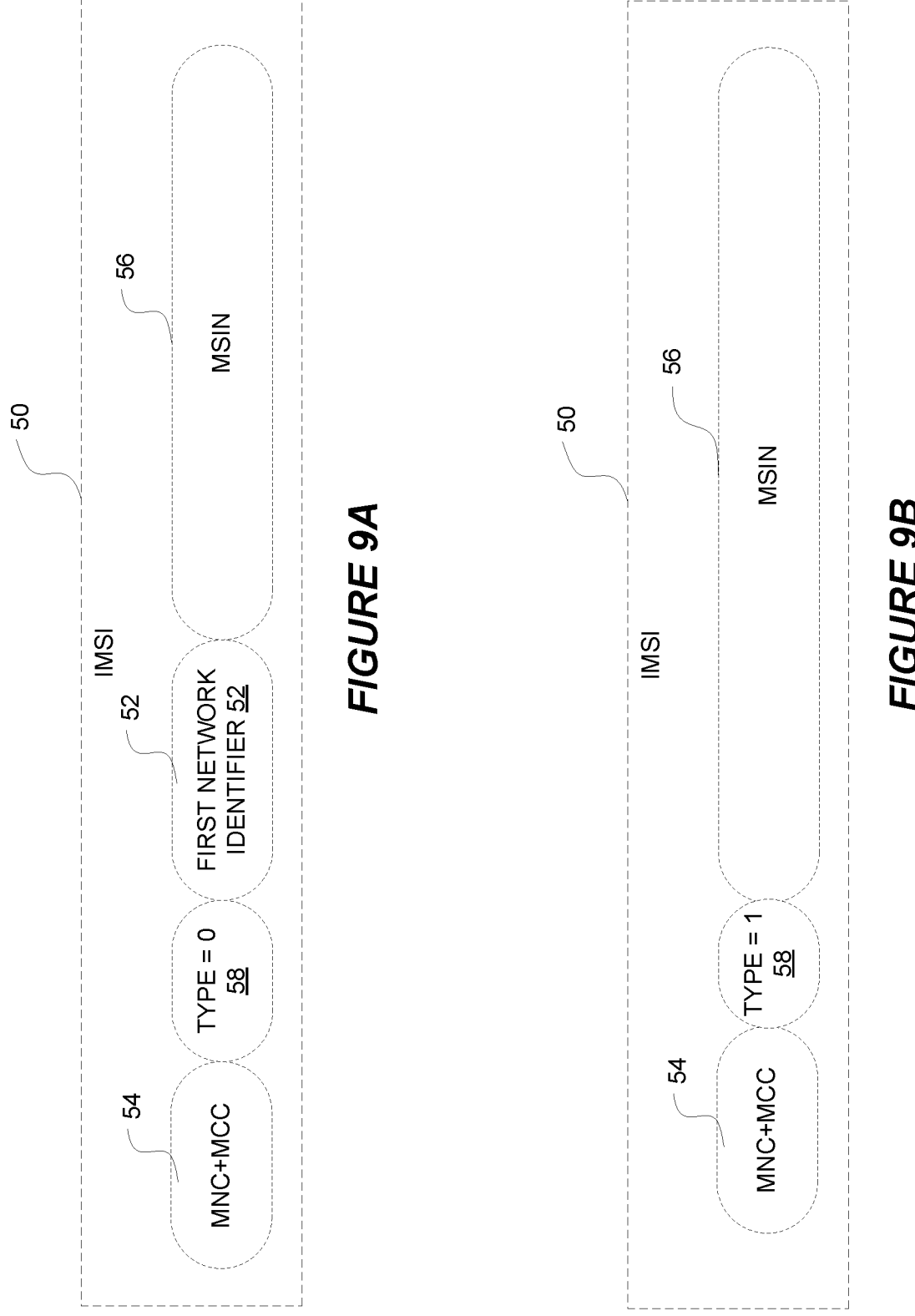
FIGS. 9A-9B are block diagrams of a subscription identifier in the form of an IMSI, including a type field, according to some embodiments.

No matter the length or nature of the subscription identifier 50, though, the subscription identifier 10S (e.g., IMSI) may also include a type field that indicates whether or not the subscription identifier 10S includes both the first network identifier 52 and the second network identifier 54. FIGS. 9A and 9B show one example for a subscription identifier 10S in the form of an IMSI.

As shown in FIG. 9A, the type field 58 occupies the first part (e.g., the first digit) of the IMSI that occurs after the MNC+MCC. If the type field 58 has a certain value (e.g., 0 in the example of FIG. 9A), it indicates the IMSI includes both the first network identifier 52 and the second network identifier 54 as described in FIG. 8. But if the type field 58 has any another value (e.g., 1-9 in the example of FIG. 9B), it indicates the IMSI does not include both the first network identifier 52 and the second network identifier 54. Rather, the rest of the IMSI as shown in FIG. 9B has only the MSIN as is conventional (except the MSIN would have fewer bits to accommodate the type field 58). Regardless, by way of the type field 58, a communication network that receives the subscription identifier 10S can advantageously know whether the subscription identifier 10S is to be treated as a legacy subscription identifier or as a new subscription identifier according to embodiments herein. Moreover, the type of subscription identifier 10S may indirectly reveal more about the type of communication device 2 and/or first network 10.

Note that some embodiments herein presuppose that allocation of subscription identifiers to respective subscriptions is performed by, or in cooperation with, the operator of the second communication network 20. Indeed, the operator of the second communication network 20 may need to ensure that the subscription identifiers which identify respective subscriptions to the second communication network 20 do not interfere or overlap with the subscription identifiers which identify respective subscriptions to the first communication network 10. The operator may for example need to leave certain subscription identifiers unallocated so that they can be used for identifying respective subscriptions to the first communication network 10. Or, the existing subscription identifiers may need to be moved to the new format described herein. If not, a transition period may be needed during which, when existing subscription identifiers (e.g., legacy IMSIs) are released due to subscription termination, they are moved from an exemption list to regular use as described herein. The exemption list, or an exemption indication added to a subscription, would list legacy subscriptions that, while having an MSIN belonging to a certain network 10, would actually not be treated as belonging to that network 10, but rather as being a legacy subscription of second communication network 20.

Figure 10:
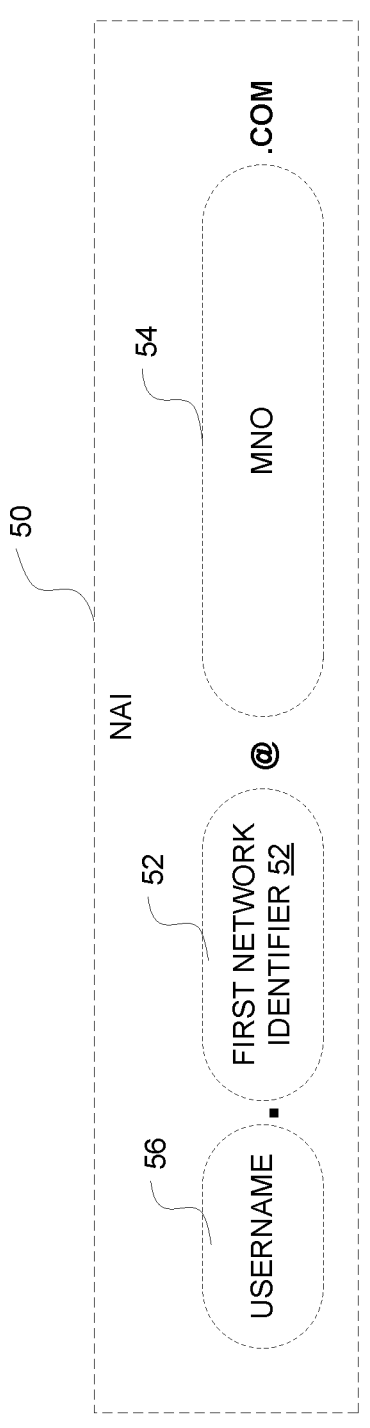
FIG. 10 is a block diagram of a subscription identifier in the form of an NAI according to some embodiments.

Although exemplified as an IMSI in some embodiments above, the subscription identifier 10S in other embodiments may be in the form of an NAI, where an NAI takes the form of username@realm. FIG. 10 shows one example. As shown in FIG. 10, the subscription identifier 10S is an NAI that includes the first network identifier 52 in the username part of the NAI. The username part thereby includes not only the legacy username part, analogous to the MSIN, but also the first network identifier 52. And the realm part remains as in the legacy format, analogous to the MNC+MCC, but identifies the second communication network 20 similarly as described above for the MNC+MCC of the IMSI herein.

Consider an example in the context of the other embodiments herein where the first communication network 10 is an NPN. In this example, the subscription identifier 10S (e.g., SUPI) may take the form of UE_N-PN_ID.NPN_ID.HPLMN_ID in IMSI format. UE_NPN_ID is the subscription ID of the subscription within the NPN. NPN_ID is the network identifier for the NPN. And HPLMN_ID is the network identifier for the HPLM. Here, UE_N-PN_ID.NPN_ID would correspond to the MSIN of the IMSI, whereas HPLMN_ID would correspond to the MNC.MCC of the IMSI. The inner subscription concealed identifier 10C may then be formed from this subscription identifier 10S as $\{UE\_NPN\_ID\}_{NPN\_PUB\_K}$. NPN_ID, where NPN_PUB_K is the public key of the NPN such that the UE_NPN_ID is encrypted with that public key. The outer subscription concealed identifier 20C may next be formed from the inner subscription concealed identifier 10C as $\{\{UE\_NPN\_ID\}_{NPN\_PUB\_K}.NPN\_ID\}_{HPLMN\_PUB\_K}$. HPLMN_ID, where HPLMN_PUB_K is the public key of the HPLMN such that $\{UE\_NPN\_ID\}_{NPN\_PUB\_K}$.NPN_ID is encrypted with that public key.

In this example, then, de-concealing the outer subscription concealed identifier 20C using the private key of the HPLMN reveals the inner subscription concealed identifier 10C. The network identifier part HPLMN_ID is discarded from the outer subscription concealed identifier 20C, though, e.g., to avoid ending up with double of it. Then, de-concealing the inner subscription concealed identifier 10C reveals the subscription identifier 10S. Except, in this example, the network identifier for the HPLMN, namely HPLMN_ID, is added to the subscription identifier 10S after de-concealing the inner subscription concealed identifier 10C. This may be done, for example, because the third communication network 30 (e.g., VPLMN) may use the subscription identifier 10S, and to this third communication network 30 the first communication network 10 (e.g., NPN) does not have any meaning, i.e., no trust or business relationship exists between those networks 10, 30 so the first communication network 10 is an unknown to the third communication network 30.

A similar example may apply where the subscription identifier 10S is in NAI format. In NAI format, the subscription identifier 10S (e.g., SUPI) may take the form of UE_NPN_ID.NPN_ID∜HPLMN_ID. The inner subscription concealed identifier may take the form of $\{UE\_NPN\_ID\}_{NPN\_PUB\_K}$@NPN_ID, and the outer subscription concealed identifier 20C may take the form of $\{\{UE\_NPN\_ID\}_{NPN\_PUB\_K}$@ NPN_ID$\}_{HPLMN\_PUB\_K}$@ HPLMN_ID.

Note, though, that in other embodiments the subscription identifier 10S (e.g., SUPI) may also look different at different network locations. In one such embodiment, the subscription identifier 10S used between the HPLMN and NPN is UE_NPN_ID.NPN_ID. Then, the HPLMN would translate the subscription identifier to a different format to be used between the HPLMN and VPLMN: UE_N-PN_ID.NPN_ID.HPLMN_ID or UE_NPN_ID.HPLM-N_ID.

Note that, in some embodiments, the subscription identifier 10S may be allocated from an address space assigned by, owned by, or otherwise managed by the second communication network 20. For example, the subscription identifier 10S may be an IMSI within a set of IMSIs assigned by, owned by, or otherwise managed by the second communication network 20, e.g., by way of the second communication network 20 owning the MNC+MCC combination common to the set of IMSIs. In one or more embodiments, then, the second communication network 20 may assign or manage which values of the first network identifier 52 identify which communication network(s) served by the second communication network 20. This may also remove the need to allocate a dedicated MNC for the first communication network 10. The first network identifier 52 may thereby help the second communication network 20 to more easily manage different subsets of subscriptions to different respective networks served by the second communication network 20.

In these and other embodiments, any communication network served by the second communication network 20 may be understood or viewed as a subnetwork of the second communication network 20. For example, a mobile virtual network or network slice may in some sense be viewed as a subnetwork of whatever network provides the infrastructure for that virtual network or network slice. In embodiments where the first communication network 10 is viewed as a subnetwork of the second communication network 20, the first network identifier 52 may accordingly be understood as a subnetwork identifier which identifies a subnetwork of the second communication network 20.

Some embodiments herein may also inform the first communication network 10 about any intermediate communication network(s) 20, 30 that are in the control signaling path between the communication device 2 and the first communication network 10. One or more embodiments, for example, inform the first communication network 10 about the existence of and/or identity of one or more of the intermediate communication networks 20 and 30. Accordingly, rather than being ignorant of whether the communication device 2 accesses the first communication network 10 via an intermediate network (e.g., because the communication network 10 does not have a direct roaming partnership with that intermediate network), the first communication network 10 is equipped with information about such an intermediate network. The first communication network 10 can then use this information for any number of policy decisions, e.g., whether to permit access via an intermediate network, whether to permit a certain service when accessed via an intermediate network, how to treat a session of the communication device, etc. Some embodiments thereby safeguard the communication network's ability to control whether and/or which intermediate network(s) are usable to access the communication network 10, even when the communication devices 2 access the communication network 10 via an intermediate network that does not have a direct roaming partnership with the communication network 10.

More particularly, the second communication network 20 according to some embodiments transmits intermediate network information to the first communication network 10. This intermediate network information indicates a third communication network 30 is in the control signaling path between the communication device and the first communication network 10. That is, the intermediate network information indicates control signaling between the communication device 2 and the first communication network 10 passes through a third communication network 30.

In some embodiments, for example, the intermediate network information includes network identifying information. The network identifying information indicates at least a portion of the identity or name of the third communication network 30. The network identifying information thereby actually identifies which communication network (namely, communication network 30) is in the control signaling path. The network identifying information may for instance indicate at least a portion of a Serving Network Name (SNN) which identifies the third communication network 30. Or, the network identifying information may indicate a Mobile Network Code (MNC) and/or Mobile Country Code (MCC) associated with the third communication network.

In other embodiments, the intermediate network information simply indicates the existence of some unidentified intermediate communication network in the control signaling path. In this case, for instance, the intermediate network information may indicate the third communication network 30 is in the control signaling path, without indicating any portion of the identity or name of the third communication network. In these and other embodiments, for example, the intermediate network information may just be a binary flag that indicates whether or not some intermediate communication network is in the control signaling path. And, based on the third communication network 30 being in the control signaling path, that flag may be set to indicate that indeed some intermediate communication network is in the control signaling path. As another example, the intermediate network information may indicate that the communication device 2 is roaming or that the communication device 2 is served by a visited communication network, i.e., a roaming partner of the second communication network 20. As still another example, the intermediate network information may indicate that such a visited communication network of the communication device 2 is in the control signaling path.

Of course, the intermediate network information may similarly also indicate the second communication network 20 as being in the control signaling path, e.g., in the same way(s) as described above with respect to the third communication network 30. In this case, then, the intermediate network information indicates multiple communication networks 20, 30 are in the control signaling path.

No matter the particular nature of the intermediate network information 40, though, the second communication network 20 in some embodiments transmits the intermediate network information to the first communication network 10 along with, included in, and/or otherwise in association with other control signaling (e.g., an authentication request) that the second communication network 20 transmits to the first communication network 10. In one or more embodiments, for example, the second communication network 20 receives control signaling (e.g., an authentication request) from the third communication network 30 that prompts the second communication network 20 to transmit the same or different control signaling (e.g., a corresponding authentication request) to the first communication network 10.

Note that, although some embodiments are described above with focus on registration of the communication device 2 with the first communication network 10 (e.g., NPN), registration herein may be performed (or viewed as being performed) with any of the first communication network 10, the second communication network 20, and/or the third communication network 30. Embodiments described above for registration with the first communication network 10 may be similarly applied for registration with the second communication network 20 and/or the third communication network 30, e.g., in terms of a policy-based decision for whether to allow such registration.

In view of the above modifications and variations, FIG. 11 depicts a method performed by a communication device 2 in accordance with particular embodiments. The method includes generating an inner subscription concealed identifier 10C (Block 1110). In some embodiments, generating the inner subscription concealed identifier 100 includes concealing at least a part of a subscription identifier 10S using cryptographic key material 10K associated with a first communication network 10, e.g., a non-public network (NPN). The subscription identifier 10S identifies a subscription to the first communication network 10.

The method as shown further comprises generating an outer subscription concealed identifier 20C (Block 1120). In some embodiments, generating the outer subscription concealed identifier 20C includes concealing the inner subscription concealed identifier 100 using cryptographic key material 20K associated with a second communication network 20, e.g., a public network. In some embodiments, then, the inner subscription concealed identifier 100 is cryptographically embedded within the outer subscription concealed identifier 20C.

The method further comprises transmitting the outer subscription concealed identifier 20C. In some embodiments, transmitting the outer subscription concealed identifier 20C is performed as part of a procedure for registering with and/or authenticating with the first communication network 10 via the second communication network 20.

In fact, in one or more such embodiments, transmitting the outer subscription concealed identifier 20C is performed as part of a procedure for registering with and/or authenticating with the first communication network 10 via both the second communication network 20 and via a visited network 30 different than the second communication network 20. In such a case, the outer subscription concealed identifier 20C may be transmitted towards and/or be directed to the visited network 30. In these and other embodiments, the method may further comprise scanning for the second communication network 20 and/or any allowed visited network included in a list of one or more allowed visited networks (Block 1100). Here, each of the one or more allowed visited networks is a roaming partner of the second communication network 20.

More particularly, in some embodiments, the outer subscription concealed identifier 20C comprises a first outer field 20C-1 and a second outer field 20C-2. The first outer field 20C-1 identifies the second communication network 20 and is not concealed using the cryptographic key material 20K associated with the second communication network 20. The second outer field 20C-2 includes the inner subscription concealed identifier 100 and is concealed using the cryptographic key material 20K associated with the second communication network 20.

Alternatively or additionally, in some embodiments, the inner subscription concealed identifier 10C comprises a first inner field and a second inner field. The first inner field identifies the first communication network 10 and is not concealed using the cryptographic key material 10K associated with the first communication network 10. The second inner field includes the at least a part of the subscription identifier 10S as concealed using the cryptographic key material 10K associated with the first communication network 10.

In some embodiments, the cryptographic key material 10K associated with the first communication network 10 is a public and private key pair associated with the first communication network 10. Alternatively or additionally, the cryptographic key material 20K associated with the second communication network 20 is a public and private key pair associated with the second communication network 20.

In some embodiments, the second communication network 20 provides an access network for the first communication network 10.

In some embodiments, transmitting the outer subscription concealed identifier 20C comprises transmitting the outer subscription concealed identifier 20C from the communication equipment 4, 6 to a visited network 30, where the visited network 30 is different from the second communication network 20.

In one embodiment, the communication equipment 4, 6 comprises an integrated circuit card 4. In this case, transmitting the outer subscription concealed identifier 20C comprises transmitting the outer subscription concealed identifier 20C from the integrated circuit card 4 to a mobile equipment 6. The integrated circuit card 4 may be either embedded or integrated within the mobile equipment 6 or is configured to be removably inserted into the mobile equipment 6.

FIG. 12 depicts a method performed by a network node 20N in accordance with other particular embodiments. The method includes receiving an outer subscription concealed identifier 20C that conceals an inner subscription concealed identifier 100 (Block 1200). The method further comprises obtaining the inner subscription concealed identifier 10C by de-concealing the outer subscription concealed identifier 20C (block 1210). In some embodiments, the inner subscription concealed identifier 100 conceals at least a part of a subscription identifier 10S which identifies a subscription to a first communication network 10, e.g., a non-public network. In some embodiments, the network node 20N is a network node (e.g., an AUSF) in a second communication network 20, e.g., a public network.

Regardless, the method further comprises transmitting the inner subscription concealed identifier 100 to the first communication network 10 (Block 1230).

In some embodiments, the outer subscription concealed identifier 20C is received from a visited network 30 that is different than the second communication network 20. In other embodiments, the outer subscription concealed identifier 20C is received (directly) from a communication device 2.

In some embodiments, the inner subscription concealed identifier 100 is obtained by de-concealing the outer subscription concealed identifier 20C using cryptographic key material 20K associated with the second communication network 20.

In some embodiments, obtaining the inner subscription concealed identifier 100 is performed based on the outer subscription concealed identifier 20C indicating that the outer subscription concealed identifier 20C conceals a subscription identifier which identifies a subscription to the second communication network 20. In this case, transmitting the inner subscription concealed identifier 100 is performed based on the inner subscription concealed identifier 100 indicating that the inner subscription concealed identifier 100 conceals a subscription identifier which identifies a subscription to the first communication network 10.

In some embodiments, the outer subscription concealed identifier 20C comprises a first outer field 20C-1 and a second outer field 20C-2. The first outer field 20C-1 identifies the second communication network 20 and is not concealed. The second outer field 20C-2 includes the inner subscription concealed identifier 100 and is concealed. In one embodiment, the second outer field 20C-2 is concealed using cryptographic key material 20K associated with the second communication network 20.

In some embodiments, the inner subscription concealed identifier 100 comprises a first inner field and a second inner field. The first inner field identifies the first communication network 10 and is not concealed. The second inner field includes the at least a part of the subscription identifier 10S as concealed.

In some embodiments, the outer subscription concealed identifier 20C is received in a message as part of a procedure for communication equipment 4, 6 to register with and/or authenticate with the first communication network 10 via the second communication network 20. In this case, transmitting the inner subscription concealed identifier 100 comprises forwarding the message to the first communication network 10 with the inner subscription concealed identifier 100 in place of the outer subscription concealed identifier 20C.

In some embodiments, the second communication network 20 provides an access network for the first communication network 10.

Embodiments herein also include corresponding apparatuses. Embodiments herein for instance include a communication device 2 configured to perform any of the steps of any of the embodiments described above for the communication device 2.

Embodiments also include a communication device 2 comprising processing circuitry and power supply circuitry. The processing circuitry is configured to perform any of the steps of any of the embodiments described above for the communication device 2. The power supply circuitry is configured to supply power to the communication device 2.

Embodiments further include a communication device 2 comprising processing circuitry. The processing circuitry is configured to perform any of the steps of any of the embodiments described above for the communication device 2. In some embodiments, the communication device 2 further comprises communication circuitry.

Embodiments further include a communication device 2 comprising processing circuitry and memory. The memory contains instructions executable by the processing circuitry whereby the communication device 2 is configured to perform any of the steps of any of the embodiments described above for the communication device 2.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the communication device 2. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 20N configured to perform any of the steps of any of the embodiments described above for the network node 20N.

Embodiments also include a network node 20N comprising processing circuitry and power supply circuitry. The processing circuitry is configured to perform any of the steps of any of the embodiments described above for the network node 20N. The power supply circuitry is configured to supply power to the network node 20N.

Embodiments further include a network node 20N comprising processing circuitry. The processing circuitry is configured to perform any of the steps of any of the embodiments described above for the network node 20N. In some embodiments, the network node 20N further comprises communication circuitry.

Embodiments further include a network node 20N comprising processing circuitry and memory. The memory contains instructions executable by the processing circuitry whereby the network node 20N is configured to perform any of the steps of any of the embodiments described above for the network node 20N.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 13:
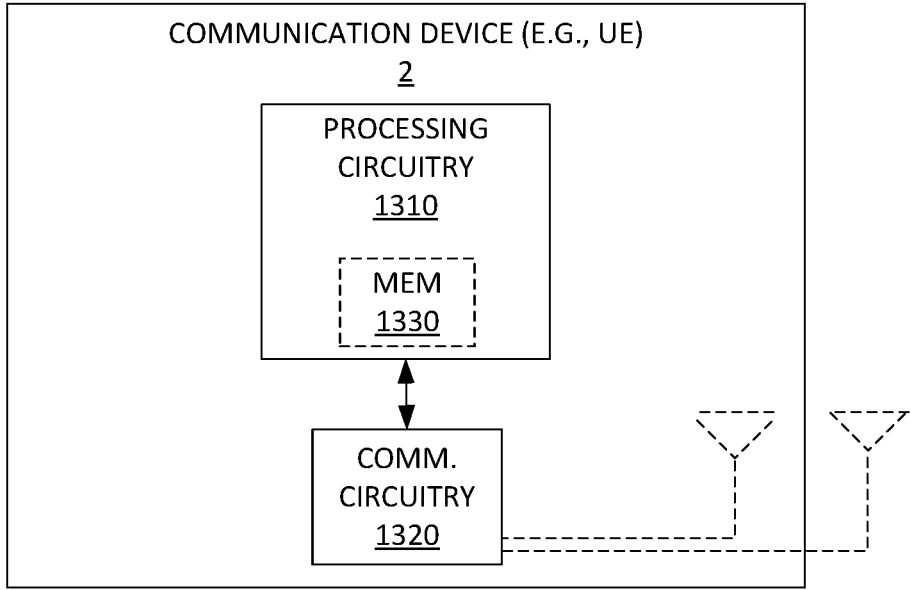
FIG. 13 is a block diagram of communication equipment according to some embodiments.

FIG. 13 for example illustrates a communication device 2 as implemented in accordance with one or more embodiments. As shown, the communication device 2 includes processing circuitry 1310 and communication circuitry 1320. The communication circuitry 1320 (e.g., radio circuitry) is configured to transmit and/or receive information to and/or from one or more other nodes, e.g., via any communication technology. Such communication may occur via one or more antennas that are either internal or external to the communication device 2. The processing circuitry 1310 is configured to perform processing described above, e.g., in FIG. 11, such as by executing instructions stored in memory 1330. The processing circuitry 1310 in this regard may implement certain functional means, units, or modules.

Figure 14:
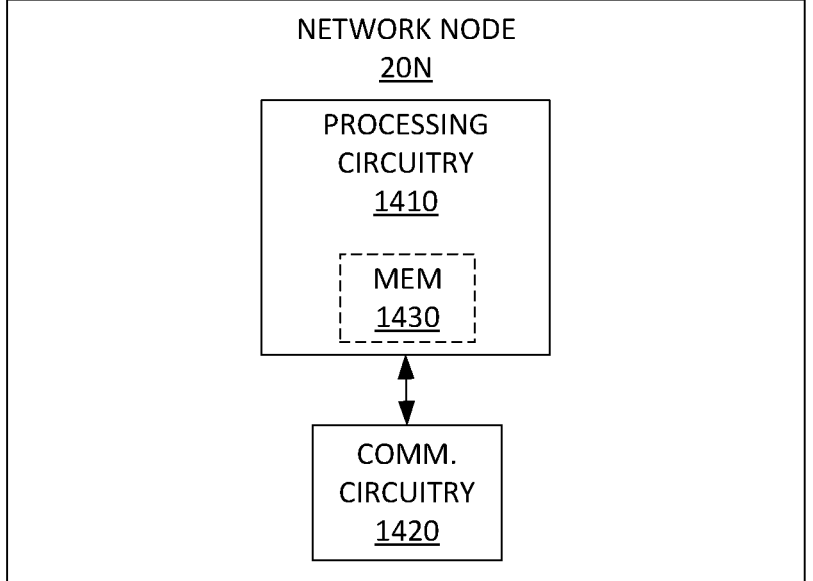
FIG. 14 is a block diagram of a network node according to some embodiments.

FIG. 14 illustrates a network node 20N as implemented in accordance with one or more embodiments. As shown, the network node 20N includes processing circuitry 1410 and communication circuitry 1420. The communication circuitry

1420 is configured to transmit and/or receive information to and/or from one or more other nodes, e.g., via any communication technology. The processing circuitry 1410 is configured to perform processing described above, e.g., in FIG. 12, such as by executing instructions stored in memory 1430. The processing circuitry 1410 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments herein may apply to any type of communication, whether wireless or wireline. When applied to wireless communication, for example, the communication device 2 may be a wireless communication device and one or more of the networks 10, 20, 30 may be a wireless communication network.

Figure 15:
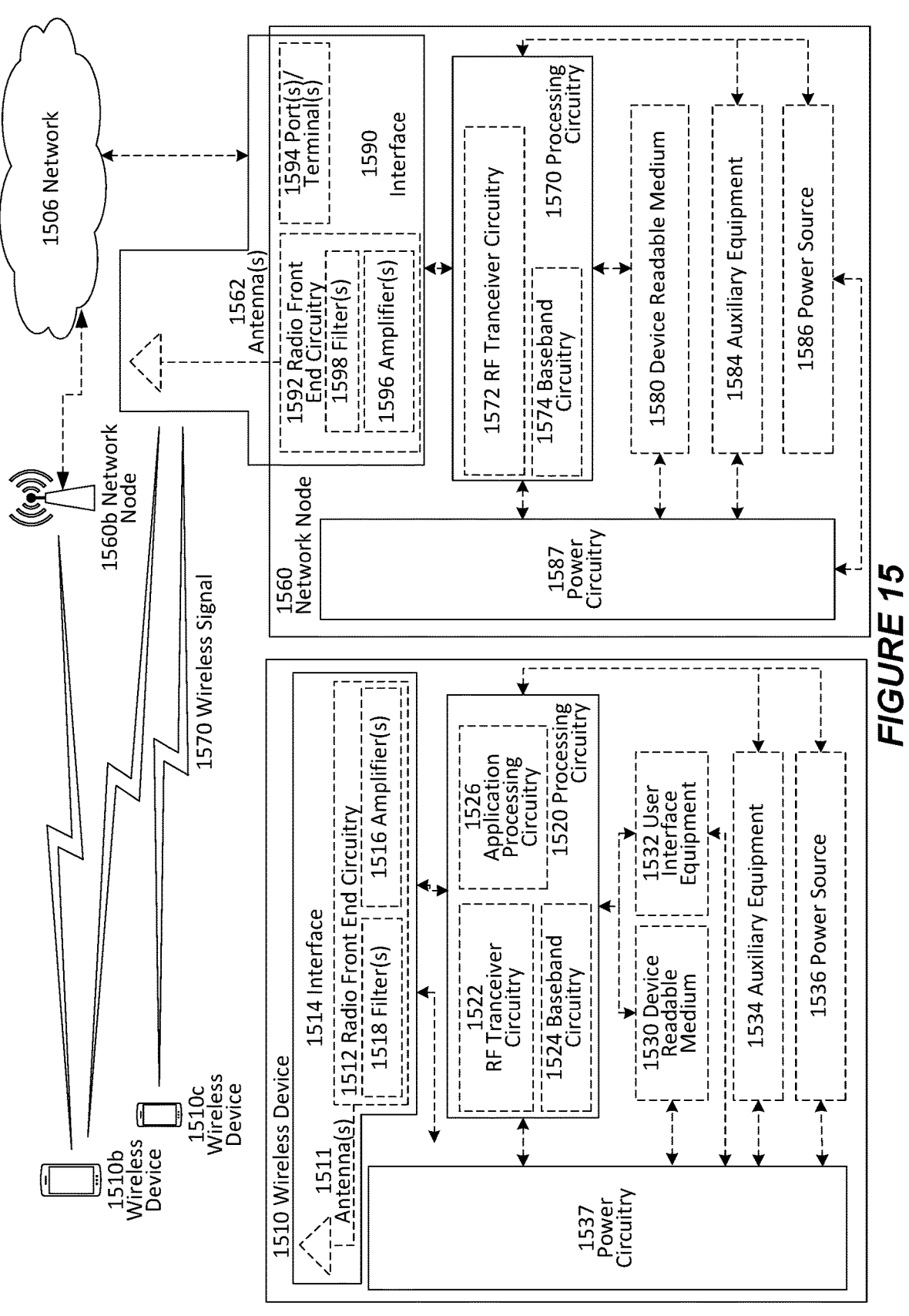
FIG. 15 is a block diagram of a wireless communication network according to some embodiments.

More particularly, although the subject matter described herein may be implemented in any appropriate type of system using any suitable components, the embodiments disclosed herein may in particular be applicable in a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
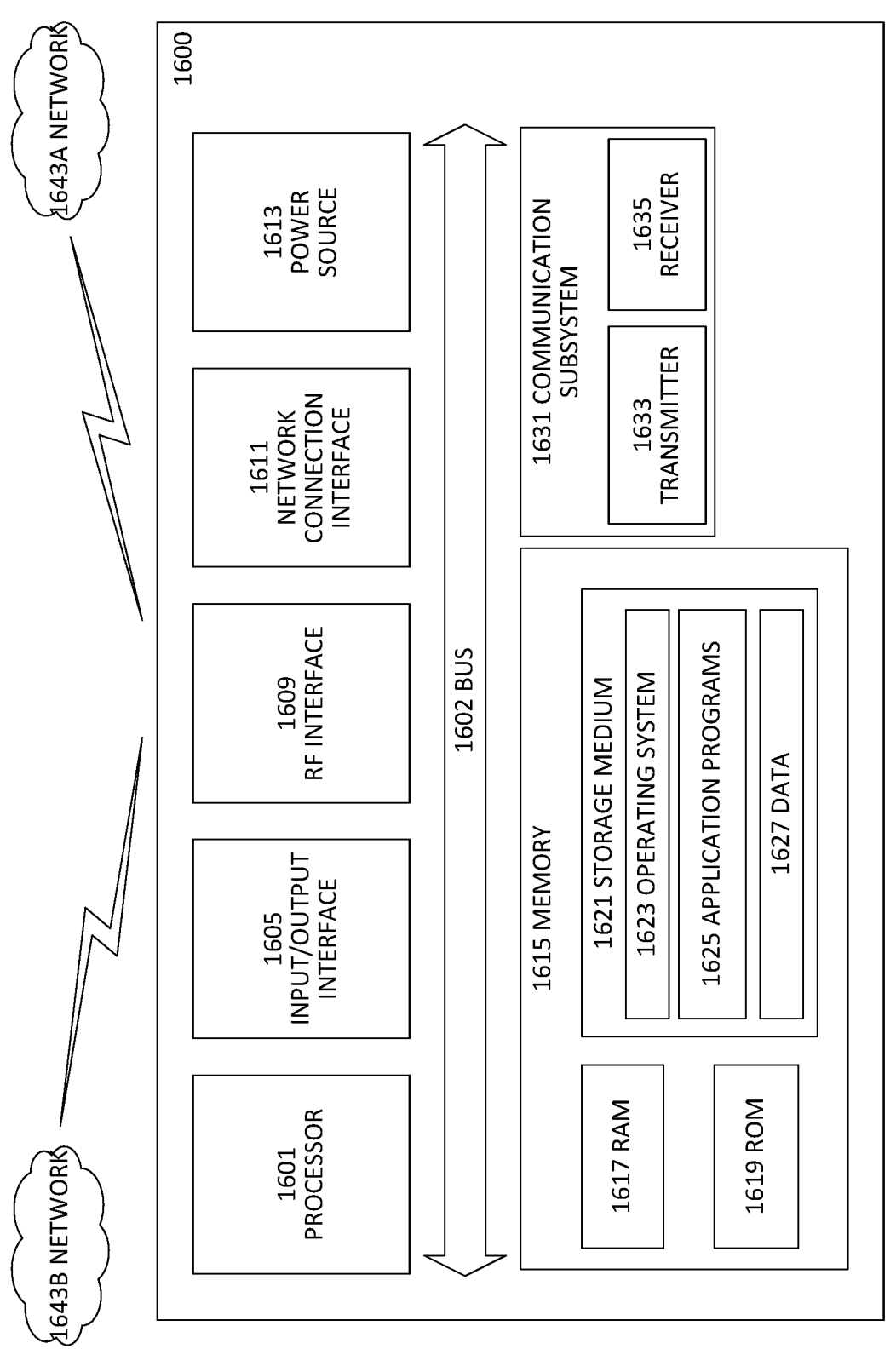
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643b may encompass wired and/or wireless networks such as a local-area network (LAN), a wide-area network (WAN), a computer network, a wireless network, a telecommunications network, another like network or any combination thereof. For example, network 1643b may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
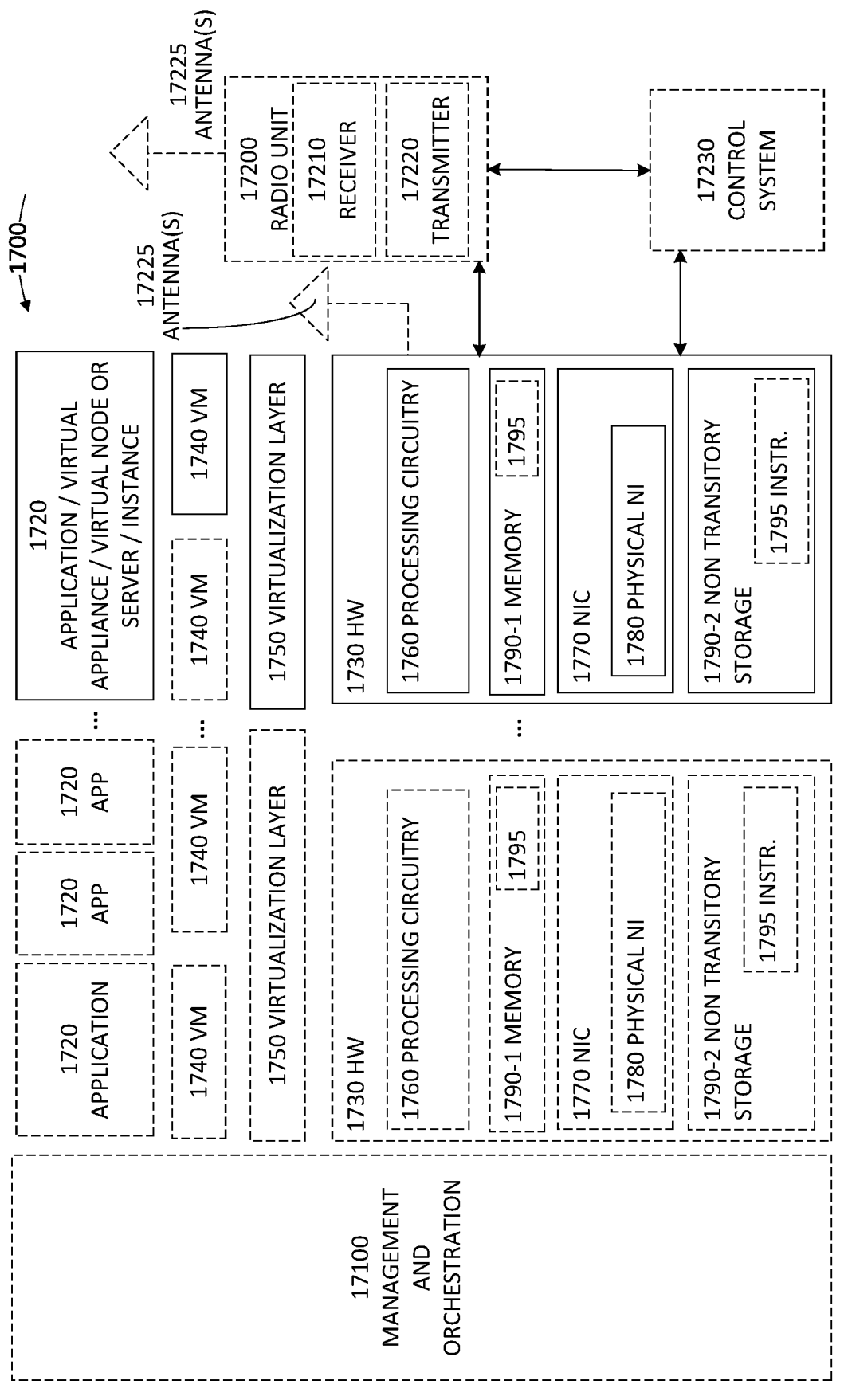
FIG. 17 is a block diagram of a virtualization environment according to some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
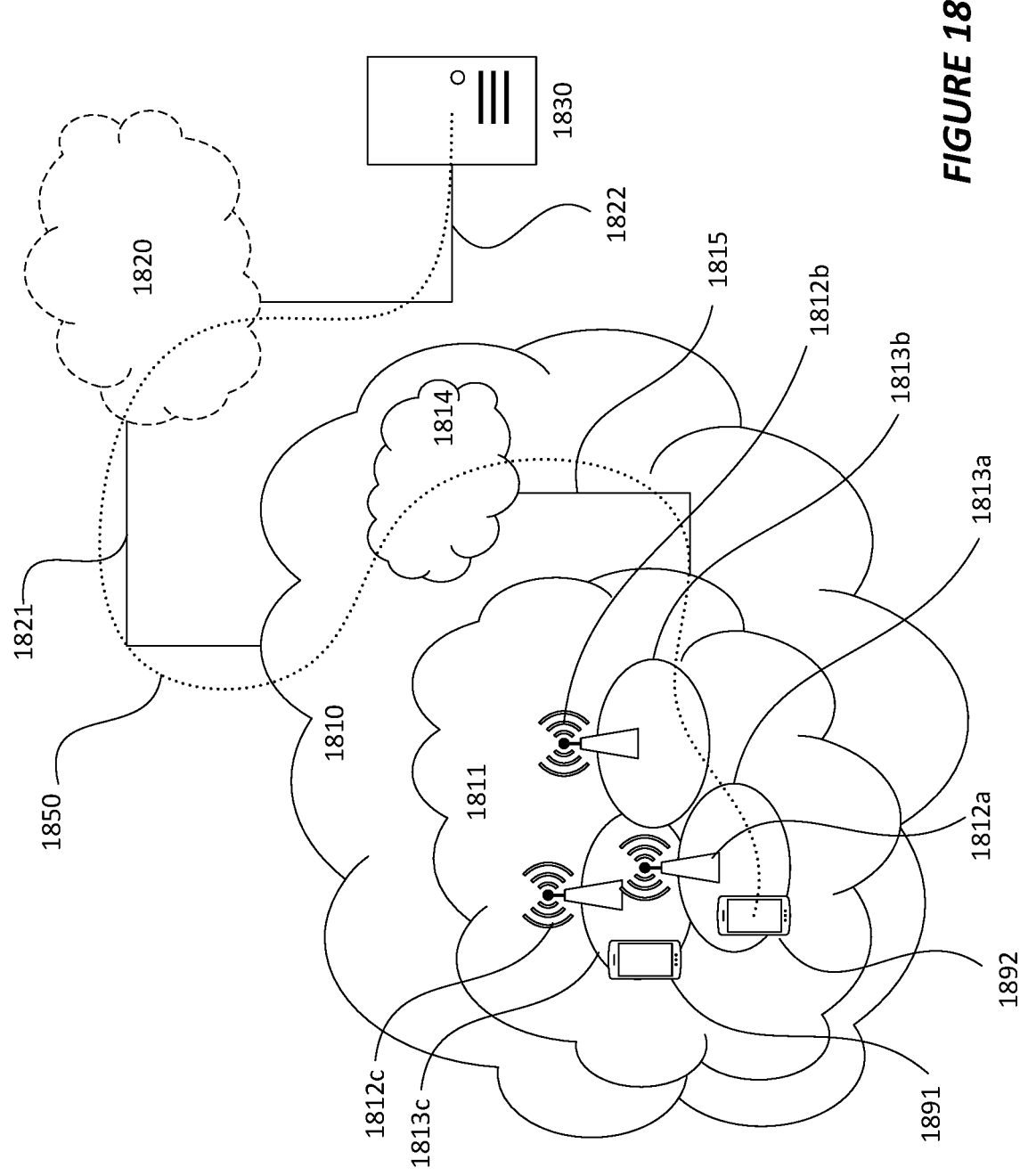
FIG. 18 is a block diagram of a communication network with a host computer according to some embodiments.

FIG. 18 illustrates a telecommunication network connected via an intermediate network to a host computer in accordance with some embodiments. In particular, with reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
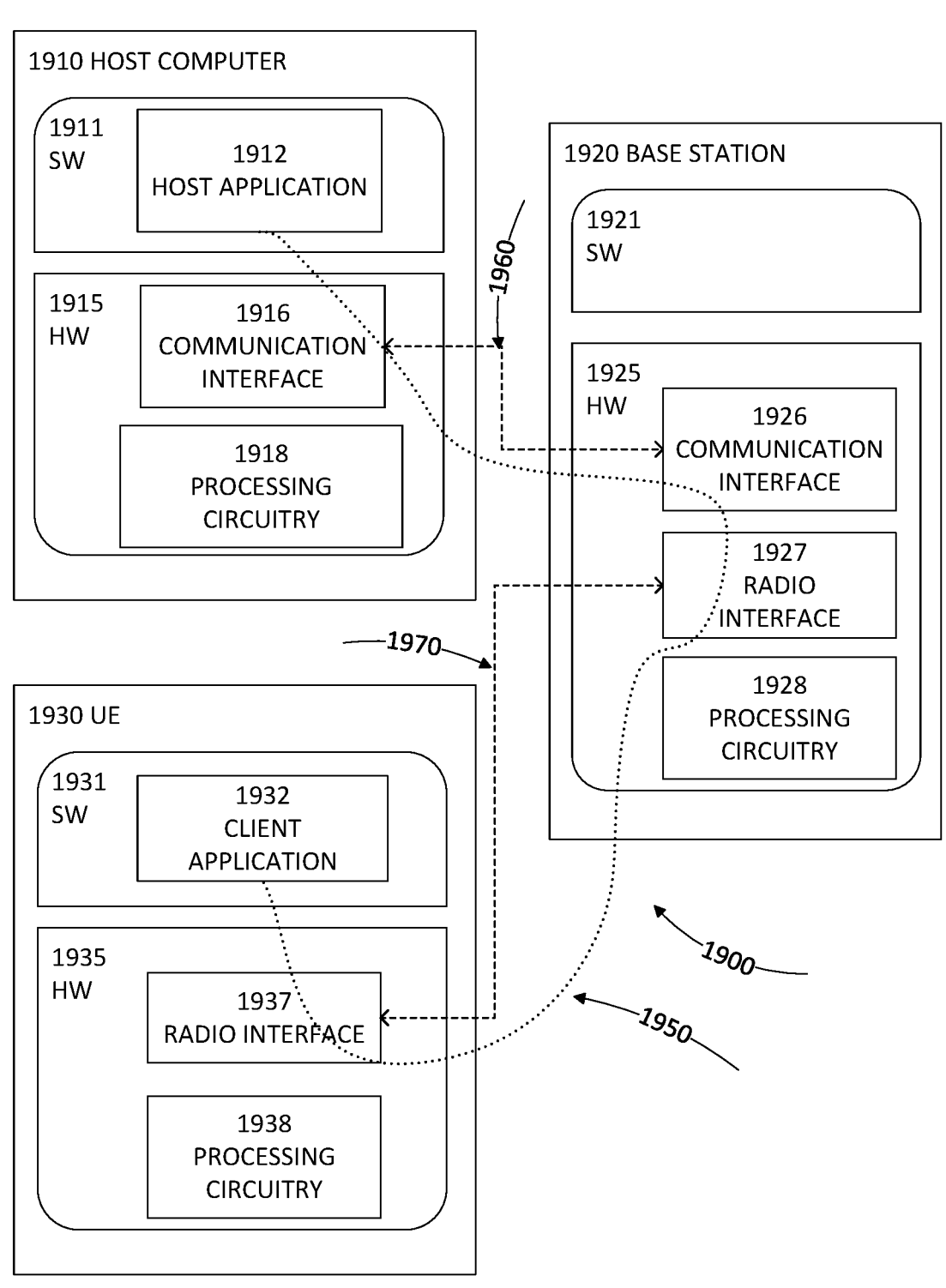
FIG. 19 is a block diagram of a host computer according to some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
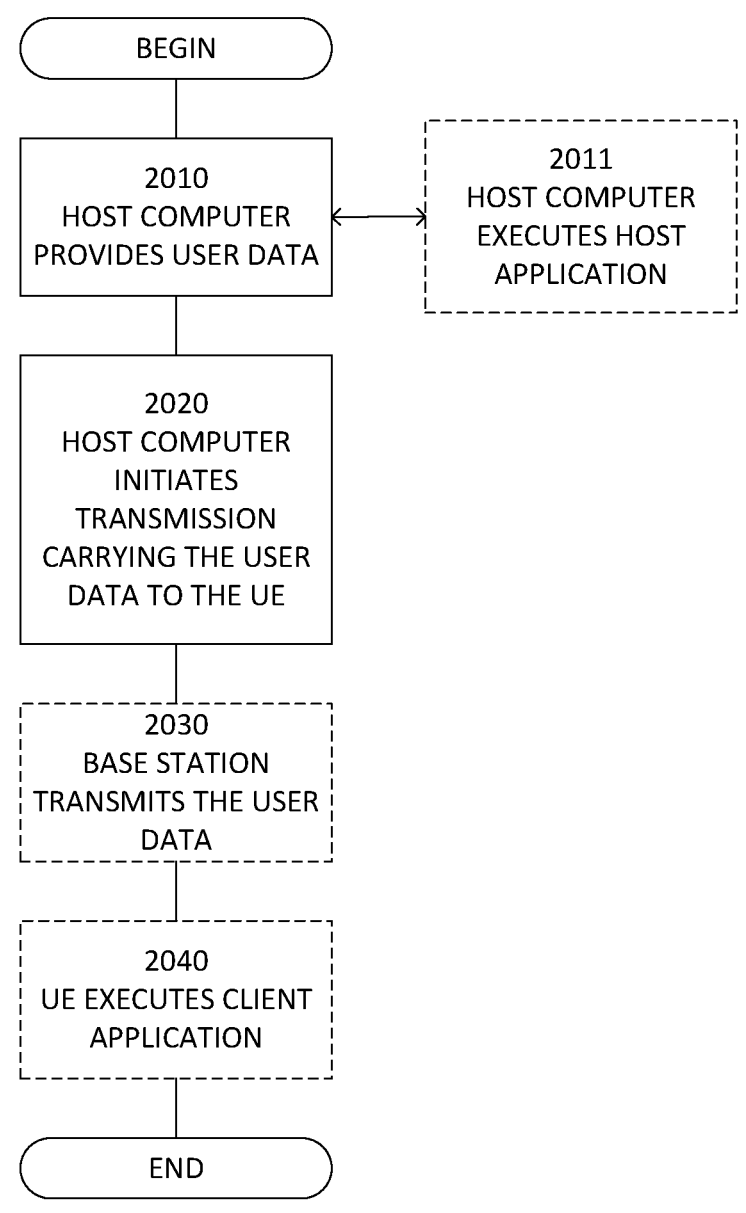
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
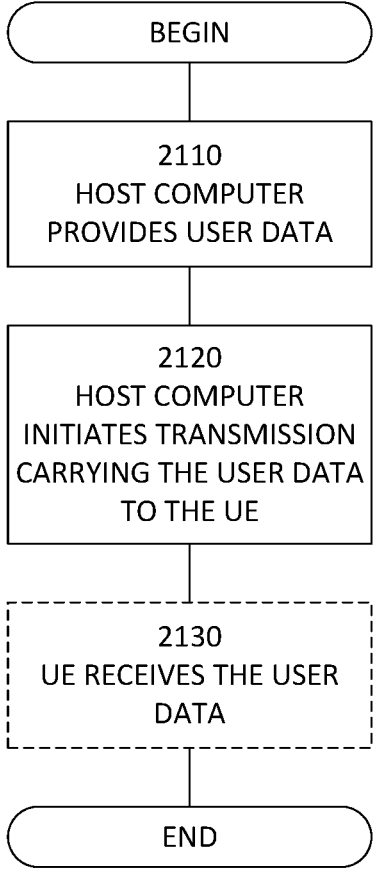
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
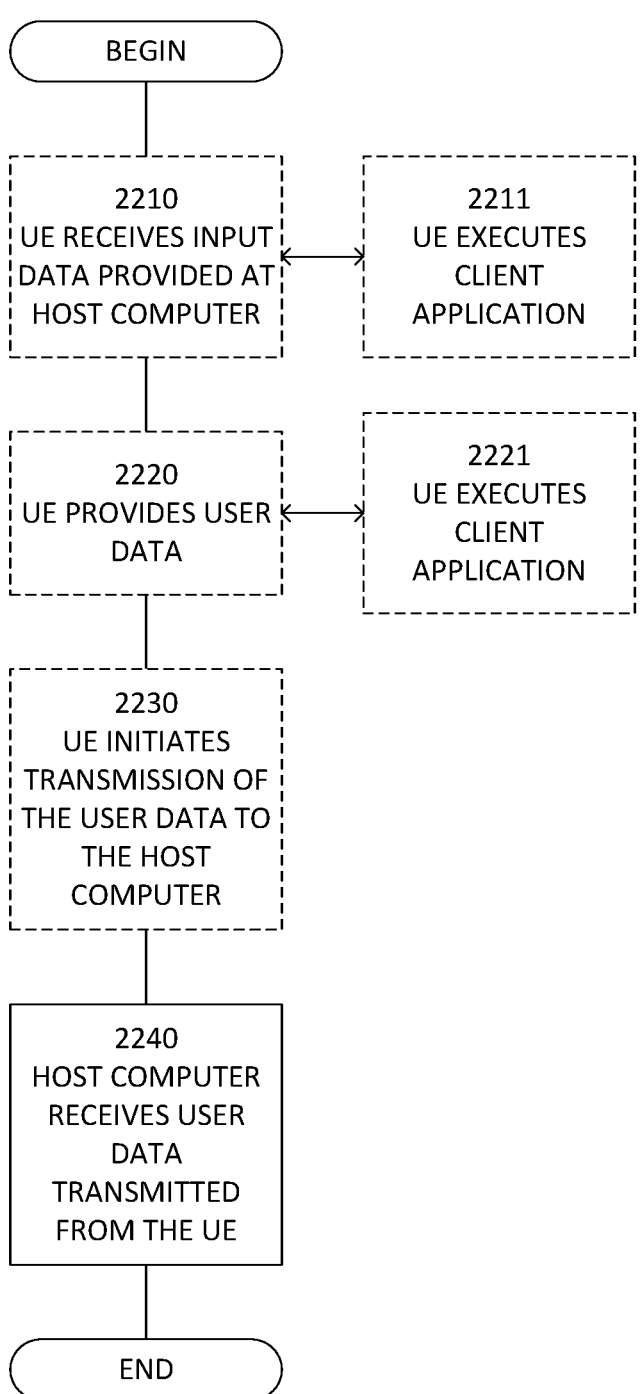
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
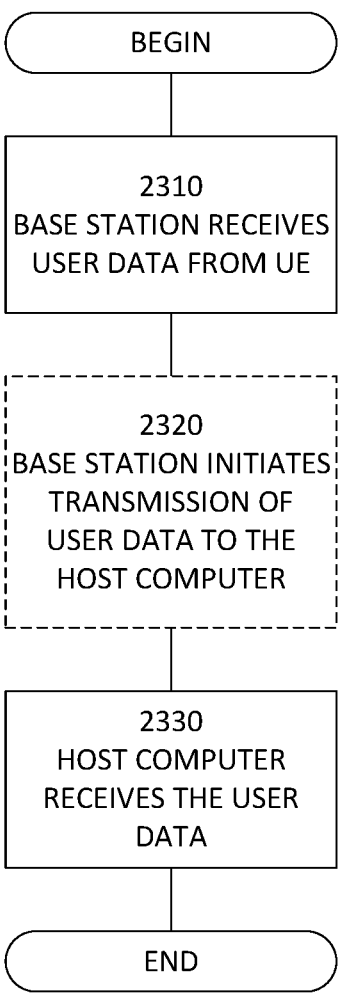
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by communication equipment, the method comprising:

generating an inner subscription concealed identifier, generating the inner subscription concealed identifier including concealing at least a part of a subscription identifier using cryptographic key material associated with a first communication network, the subscription identifier identifying a subscription to the first communication network, the inner subscription concealed identifier comprising a first inner field and a second inner field, the first inner field identifying the first communication network and not concealed using the cryptographic key material associated with the first communication network, and the second inner field including the at least a part of the subscription identifier as concealed using the cryptographic key material associated with the first communication network;

generating an outer subscription concealed identifier, generating the outer subscription concealed identifier including concealing the inner subscription concealed identifier using cryptographic key material associated with a second communication network; and transmitting the outer subscription concealed identifier.

2. The method of claim 1, wherein the outer subscription concealed identifier comprises a first outer field and a second outer field, wherein the first outer field identifies the second communication network and is not concealed using the cryptographic key material associated with the second communication network, and wherein the second outer field includes the inner subscription concealed identifier and is concealed using the cryptographic key material associated with the second communication network.

3. The method of claim 1, wherein the cryptographic key material associated with the first communication network is a public and private key pair associated with the first communication network, and/or wherein the cryptographic key material associated with the second communication network is a public and private key pair associated with the second communication network.

4. The method of claim 1, wherein the second communication network provides an access network for the first communication network.

5. The method of claim 1, wherein transmitting the outer subscription concealed identifier comprises transmitting the outer subscription concealed identifier from the communication equipment to a visited network, wherein the visited network is different from the second communication network.

6. The method of claim 1, wherein the communication equipment comprises an integrated circuit card, and wherein transmitting the outer subscription concealed identifier comprises transmitting the outer subscription concealed identifier from the integrated circuit card to a mobile equipment, wherein the integrated circuit card is either embedded or integrated within the mobile equipment or is configured to be removably inserted into the mobile equipment.

7. The method of claim 1, further comprising performing a procedure for registering with and/or authenticating with the first communication network via the second communication network and via a visited network different than the second communication network, wherein transmitting the outer subscription concealed identifier is performed as part of the procedure.

8. The method of claim 1, further comprising scanning for the second communication network and/or any allowed visited network included in a list of one or more allowed visited networks, wherein each of the one or more allowed visited networks is a roaming partner of the second communication network.

9. A method performed by a network node, the method comprising:

receiving an outer subscription concealed identifier that conceals an inner subscription concealed identifier;

obtaining the inner subscription concealed identifier by de-concealing the outer subscription concealed identifier, the inner subscription concealed identifier concealing at least a part of a subscription identifier which identifies a subscription to a first communication network, the network node a network node in a second communication network, the inner subscription concealed identifier comprising a first inner field and a second inner field, the first inner field identifying the first communication network and not concealed, and the second inner field including the at least a part of the subscription identifier as concealed; and transmitting the inner subscription concealed identifier to the first communication network.

10. The method of claim 9, wherein the outer subscription concealed identifier is received from a visited network that is different than the second communication network.

11. The method of claim 9, wherein the outer subscription concealed identifier is received from a communication device.

12. The method of claim 9, wherein said obtaining comprises obtaining the inner subscription concealed identifier by de-concealing the outer subscription concealed identifier using cryptographic key material associated with the second communication network.

13. The method of claim 9, wherein said obtaining is performed based on the outer subscription concealed identifier indicating that the outer subscription concealed identifier conceals a subscription identifier which identifies a subscription to the second communication network, and wherein said transmitting is performed based on the inner subscription concealed identifier indicating that the inner subscription concealed identifier conceals a subscription identifier which identifies a subscription to the first communication network.

14. The method of claim 9, wherein the outer subscription concealed identifier comprises a first outer field and a second outer field, wherein the first outer field identifies the second communication network and is not concealed, and wherein the second outer field includes the inner subscription concealed identifier and is concealed.

15. The method of claim 9, wherein the outer subscription concealed identifier is received in a message as part of a procedure for communication equipment to register with and/or authenticate with the first communication network via the second communication network, and wherein said transmitting comprises forwarding the message to the first communication network with the inner subscription concealed identifier in place of the outer subscription concealed identifier.

16. The method of claim 9, wherein the second communication network provides an access network for the first communication network.

17. Communication equipment comprising:

communication circuitry; and processing circuitry configured to:

generate an inner subscription concealed identifier, wherein generating the inner subscription concealed identifier includes concealing at least a part of a subscription identifier using cryptographic key material associated with a first communication network, wherein the subscription identifier identifies a subscription to the first communication network, the inner subscription concealed identifier comprising a first inner field and a second inner field, the first inner field identifying the first communication network and not concealed using the cryptographic key material associated with the first communication network, and the second inner field including the at least a part of the subscription identifier as concealed using the cryptographic key material associated with the first communication network;

generate an outer subscription concealed identifier, generating the outer subscription concealed identifier including concealing the inner subscription concealed identifier using cryptographic key material associated with a second communication network; and transmit the outer subscription concealed identifier.

18. A network node, the network node comprising:

communication circuitry; and processing circuitry configured to:

receive an outer subscription concealed identifier that conceals an inner subscription concealed identifier;

obtain the inner subscription concealed identifier by de-concealing the outer subscription concealed identifier, the inner subscription concealed identifier concealing at least a part of a subscription identifier which identifies a subscription to a first communication network, the network node a network node in a second communication network, the inner subscription concealed identifier comprising a first inner field and a second inner field, the first inner field identifying the first communication network and not concealed, and the second inner field including the at least a part of the subscription identifier as concealed; and transmit the inner subscription concealed identifier to the first communication network.

* * * * *